United States Patent
Matsumura et al.

(10) Patent No.: US 8,036,647 B2
(45) Date of Patent: Oct. 11, 2011

(54) VEHICLE INFORMATION COMMUNICATION SYSTEM, MANAGEMENT SERVER, ON-VEHICLE DEVICE, AND VEHICLE INFORMATION COMMUNICATION METHOD

(75) Inventors: Takeshi Matsumura, Susono (JP); Naoki Taki, Okazaki (JP); Atsushi Watanabe, Anjo (JP); Takenori Shimizu, Kuwana (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 707 days.

(21) Appl. No.: 11/791,976

(22) PCT Filed: Jun. 5, 2006

(86) PCT No.: PCT/JP2006/311236
§ 371 (c)(1),
(2), (4) Date: May 31, 2007

(87) PCT Pub. No.: WO2006/134799
PCT Pub. Date: Dec. 21, 2006

(65) Prior Publication Data
US 2008/0214165 A1 Sep. 4, 2008

(30) Foreign Application Priority Data
Jun. 15, 2005 (JP) .................... 2005-175291

(51) Int. Cl.
*H04W 4/00* (2009.01)
(52) U.S. Cl. ......... 455/414.3; 705/417; 705/5; 340/933; 701/32
(58) Field of Classification Search ............... 455/414.3; 705/417, 5; 701/32
See application file for complete search history.

(56) References Cited

U.S. PATENT DOCUMENTS

| | | | |
|---|---|---|---|
| 4,360,875 A | 11/1982 | Behnke | |
| 2002/0174360 A1 | 11/2002 | Ikeda | |
| 2004/0236508 A1 | 11/2004 | Ogasawara | |
| 2005/0080752 A1* | 4/2005 | Uehara et al. | 705/417 |

FOREIGN PATENT DOCUMENTS

| | | |
|---|---|---|
| EP | 1 172 768 | 1/2002 |
| JP | 2002-116977 | 4/2002 |
| JP | 2002-245381 | 8/2002 |
| JP | 2003-099350 | 4/2003 |
| JP | 2003-178394 | 6/2003 |
| JP | 2003-271561 | 9/2003 |
| JP | 2004-96272 | 3/2004 |
| JP | 2004-102939 | 4/2004 |
| JP | 2004-348476 | 9/2004 |
| JP | 2005-115583 | 4/2005 |

OTHER PUBLICATIONS

Notification of the First Office Action for Chinese Application No. 2006800016840, dated Dec. 18, 2009.
Suppl. European Search Report dated Mar. 3, 2009.
Office Action for Japanese Appl. No. 2007-521248 dated Feb. 1, 2011.

* cited by examiner

*Primary Examiner* — Pierre-Louis Desir
(74) *Attorney, Agent, or Firm* — Finnegan, Henderson, Farabow, Garrett & Dunner, LLP

(57) ABSTRACT

A vehicle information communication system includes a management server 2 whereby an information terminal 4 connected to a network 1 and an on-vehicle device of the vehicle 5 are in communication with each other; wherein the management server 2 includes a contractor confirming part 12 configured to send contractor information of the vehicle information communication system to the vehicle 5.

13 Claims, 24 Drawing Sheets

FIG.3
(a)
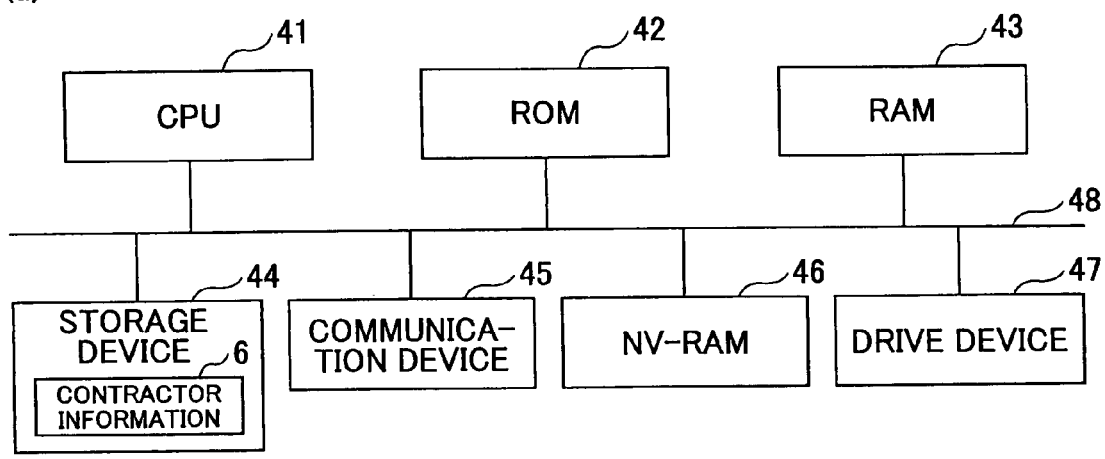
(b)
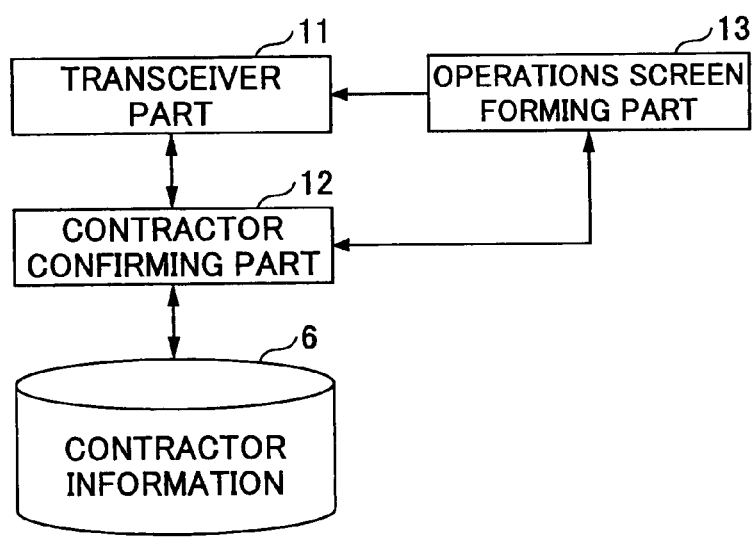

FIG.4

| CONTRACT ID | XXX-XXXX-XXXXX |
|---|---|
| USER ID | XXXX-XXXX |
| NAME | ○TA △RO |
| ADDRESS | 〒123-4567<br>○○ PREFECTURE ×× CITY 1-2-3 |
| PHONE NUMBER | 090-XXXX-XXXX |
| SEX | MALE |
| AGE | ○○YEARS OLD |
| PASSWORD | XXXXXX |

FIG.11

| CONTRACT ID | XXX-XXXX-XXXXX |
|---|---|
| USER ID | XXXX-XXXX |
| NAME | ○TA △RO |
| ADDRESS | 〒123-4567<br>○○ PREFECTURE ×× CITY 1-2-3 |
| PHONE NUMBER | 090-XXXX-XXXX |
| SEX | MALE |
| AGE | ○○ YEARS OLD |
| PASSWORD | XXXXXX |
| password expiration date | ○○ year ○○(month) ○○(day) |

FIG.14
(a)
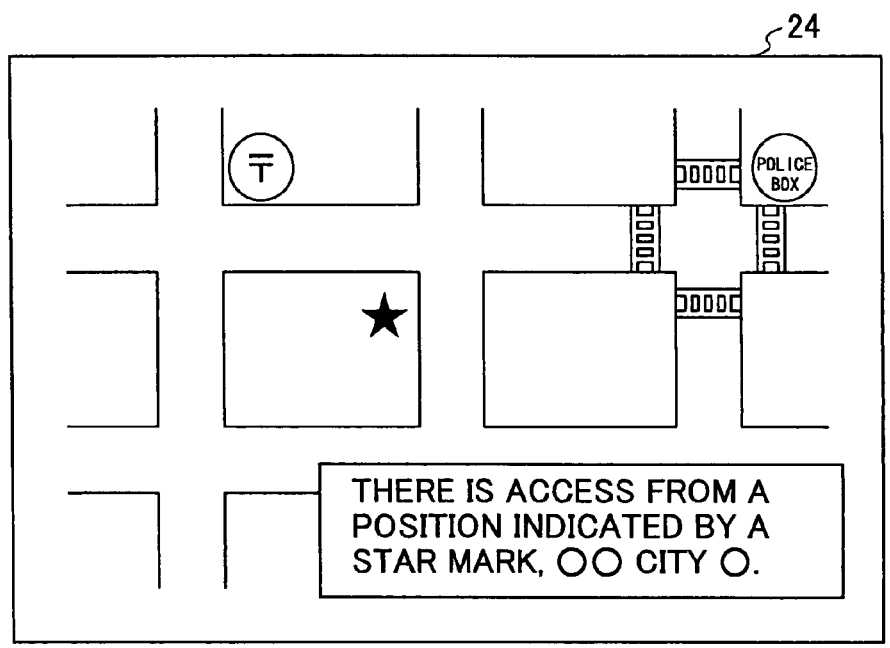
(b)
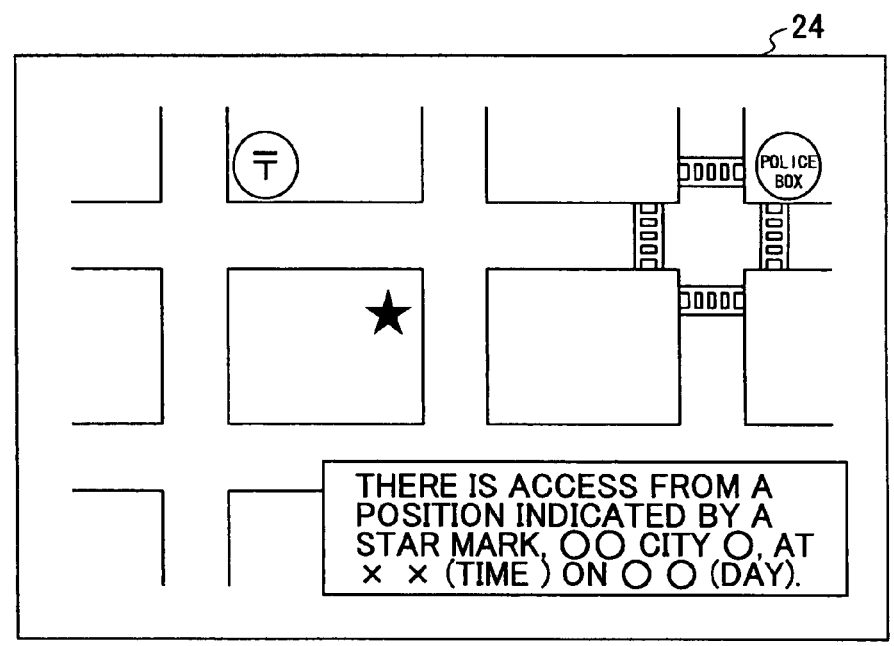

FIG.15

| CONTRACT ID | XXX-XXXX-XXXXX |
|---|---|
| USER ID | XXXX-XXXX |
| NAME | ○TA △RO |
| ADDRESS | 〒123-4567<br>○○ PREFECTURE ×× CITY 1-2-3 |
| PHONE NUMBER | 090-XXXX-XXXX |
| SEX | MALE |
| AGE | ○○ YEARS OLD |
| PASSWORD | XXXXXX |
| REGISTERED PLACE 1 | HOME (LATITUDE, LONGITUDE, HEIGHT ABOVE SEA LEVEL) |
| REGISTERED PLACE 2 | PARKING LOT (LATITUDE, LONGITUDE, HEIGHT ABOVE SEA LEVEL) |
| REGISTERED PLACE 3 | WORKING PLACE (LATITUDE, LONGITUDE, HEIGHT ABOVE SEA LEVEL) |
| ⋮ | ⋮ |

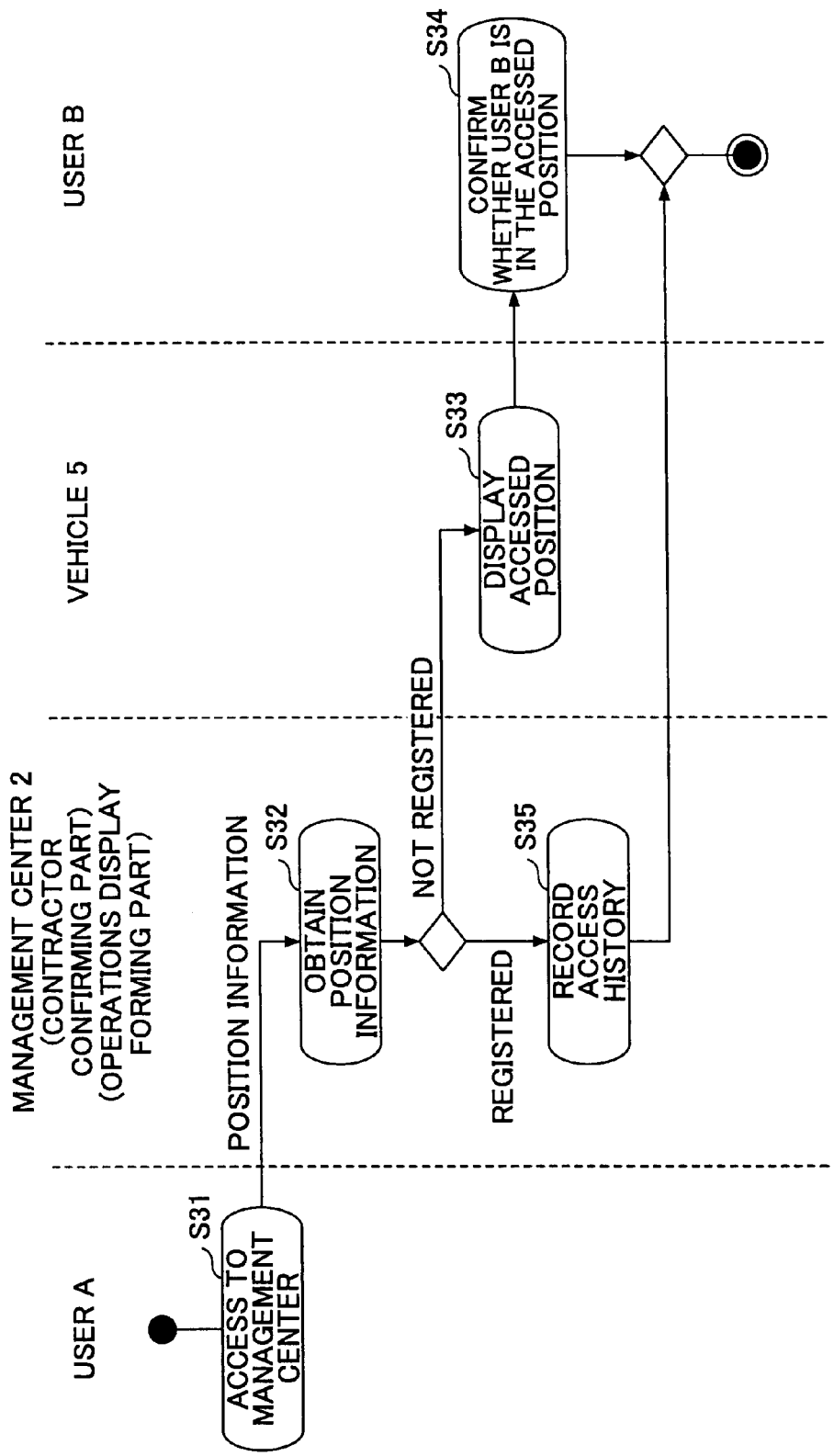

FIG.17

(a)
| | |
|---|---|
| ACCESS TIME | : ○○:○○ |
| TIME STAMP | : OBTAINED (○○:○○:××) |
| ACCESS MOBILE | : MOBILE TERMINAL ID |
| ACCESS POSITION | : ○○TOWN ○○ (LATITUDE, LONGITUDE, HEIGHT ABOVE SEA LEVEL) |
| OPERATIONS CONTENTS | : POSITION OBTAINING |

(b)
THERE IS ACCESS NOW.
CALLING PARTY NUMBER: 090-××××-××××

FIG.23

(a)
SERVICE CONTRACTED BY OTHER PEOPLE STILL REMAINS.
UNDER THIS SITUATION, THE POSITION OF THE VEHICLE MAY BE OBTAINED BY OTHER PEOPLE OR REMOTE OPERATIONS SUCH AS DOOR LOCKING MAY BE DONE.

(b)
DO YOU CHANGE ADDRESS REGISTERED IN THE CONTRACTOR INFORMATION?

VEHICLE INFORMATION COMMUNICATION SYSTEM, MANAGEMENT SERVER, ON-VEHICLE DEVICE, AND VEHICLE INFORMATION COMMUNICATION METHOD

TECHNICAL FIELD

The present invention generally relates to vehicle information communication systems, management servers, on-vehicle devices, and vehicle information communication methods. More particularly, the present invention relates to a vehicle information communication system whereby communication with a vehicle is made from an information terminal used by a contractor via a management center, a management server, an on-vehicle device, and a vehicle information communication method.

BACKGROUND ART

Advancement of a vehicle information providing service (telematics service where an automobile takes a leading part) has been accelerating. Because of this, various kinds of services are provided an owner of the automobile via the automobile or a driver (the owner), and it becomes easy to implement two-way exchange of various kinds of information. (See, for example, Patent Document 1).

In the vehicle information communication service, even if the vehicle and the owner are separated from each other, communications between the vehicle and an information terminal of the owner of the vehicle can be made through a management center. The owner of the vehicle operates the information terminal so as to know a parking place of the vehicle or receive detection notice of starting of an engine of the vehicle from a remote location. Therefore, even if a contractor of the vehicle information providing service is separated from the vehicle, the contractor can obtain information with respect to the status of the vehicle and operate an on-vehicle device.

In a case where the vehicle information communication service is used, the contractor makes a designated contract with the management center in advance so as to register contractor information such as address, name, or a mobile phone number and a password for identification. If the contractor obtains information of the vehicle by remote operations from a remote location, identification is made by identification operations with the information terminal so that various kinds of services provided by the vehicle information providing service can be used.

[Patent Document 1] Japanese Laid-Open Patent Application Publication No. 2004-102939

DISCLOSURE OF THE INVENTION

Problems to be Solved by the Invention

In the meantime, the owner of the vehicle may be transferred by auction or bargain between individuals. If the owner of the vehicle is transferred by the bargain between individuals or the vehicle is rented by another while the contract for the vehicle information communication service still exists, variance between the contractor of the vehicle information communication service and the owner of the vehicle may be generated.

FIG. 1 is a schematic view showing a case where the owner of the vehicle is different from the contractor of a vehicle information communication service. A user (contractor) A of a vehicle 5 makes a contract for vehicle information communication service with a management center 2 and then assigns the vehicle 5 to a user B.

In a case where the user A does not dissolve the contract, while the contract still exists between the user A and the vehicle information communication service, the user B drives the vehicle 5. If the user B newly makes a contract with the vehicle information communication service, existence of the contract between the user A and the vehicle information communication service may be found by a vehicle number of the vehicle 5 or the like. However, the user B does not always make the contact of the vehicle information communication service and does not always make the contact with an administration party of the same vehicle information communication service.

Thus, once the owner of the vehicle is different from the contractor of the vehicle information communication service, since it is rare that the vehicle 5 queries the owner about the identification of the contractor in the vehicle information communication service, the user B getting in the vehicle 5 may use the vehicle 5 without knowing the existence of the vehicle information communication service.

Accordingly, if the contractor is different from the owner as shown in FIG. 1, activity undesirable for the user B, such that the user A performs remote operations by using the information terminal so as to obtain the vehicle information or the position of the vehicle 5 or to operate the on-vehicle device, may occur while the user B does not recognize this.

In order to prevent this activity, it is preferable to identify whether the user B who is a present user of the vehicle 5 is an actual contractor. However, since the management center 2 or the vehicle 5 does not recognize assignment of the vehicle or timing of the assignment, periodic identification operations such as identification operations every time of getting in the vehicle 5 may be necessary. This may be annoyed to the user of the vehicle.

Means for Solving Problems

Accordingly, embodiments of the present invention may provide a novel and useful vehicle information communication system, management server, on-vehicle device, and vehicle information communication method, solving one or more of the problems discussed above.

More specifically, the embodiments of the present invention may provide a vehicle information communication system, a management server, a on-vehicle device, and a vehicle information communication method, whereby the user of the vehicle can recognize that the contract of the vehicle information communication service continues without making the user of the vehicle information communication service feel annoyed.

One aspect of the present invention may be to provide a vehicle information communication system, including: a management server whereby an information terminal connected to a network and an on-vehicle device of a vehicle are in communication with each other; wherein the management server includes a contractor confirming part configured to send contractor information of the vehicle information communication system to the vehicle.

Effect of the Invention

According to the embodiment of the present invention, it is possible to provide a vehicle information communication system, a management server, an on-vehicle device, and a vehicle information communication method, whereby it is possible to prevent a contractor who assigns the vehicle from doing illegal activity affecting the driver or the vehicle, without making the user of the vehicle information communication service feel annoyed.

Other objects, features, and advantages of the present invention will become more apparent from the following detailed description when read in conjunction with the accompanying drawings.

BRIEF DESCRIPTION OF DRAWINGS

FIG. 3 is a block diagram showing functions of a management center;

FIG. 4 is a table showing an example of contractor information, the information being registered in the management center;

FIG. 11 is a table showing an example of contractor information, of a third embodiment of the present invention;

FIG. 14 is a view showing position information displayed on the display device;

FIG. 15 is a table showing an example of contractor information of the fourth embodiment of the present invention;

FIG. 16 is a timing chart showing a flow of position information of the information terminal to the user B with reference to a registered position in a case where the user A accesses the management center;

FIG. 17 is a view showing an example of details of access information displayed on the display device;

FIG. 23 is a view showing an example of a message for calling attention, the message being displayed on the display device;

EXPLANATION OF REFERENCE SIGNS

Figure 1:
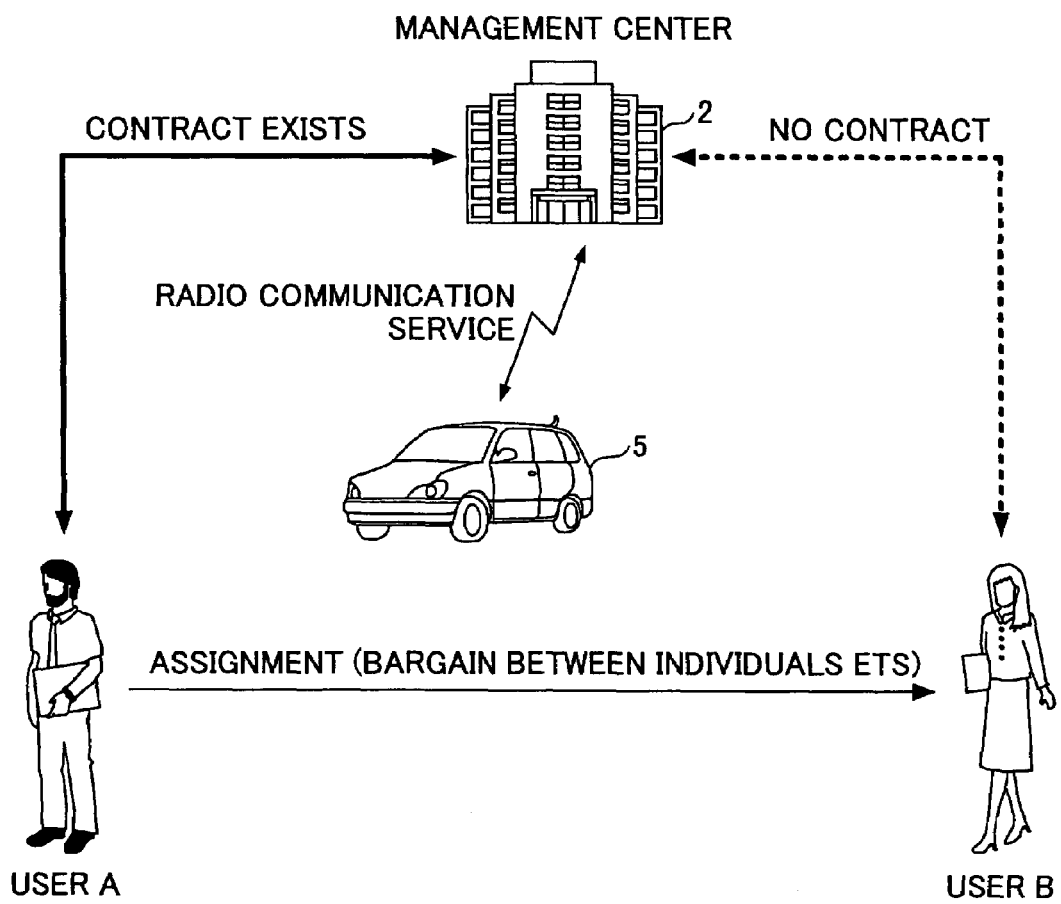
FIG. 1 is a schematic view showing a case where an owner of a vehicle is different from a contractor of a vehicle information communication service.

1 Network
2 Management center
3 Base station
4 Information terminal
5 Vehicle
6 Contractor information
7 GPS satellite
11 Transceiver part
12 Contractor confirming part
13 Operations screen forming part
19 Output device
20 Approval switch
21 Transceiver device
22 Remote operations ECU
23 Door control ECU
24 Air Conditioner ECU
25 Security ECU
26 Engine ECU
27 Display device
28 Speaker
29 Verification ECU
30 Car Navigation ECU
31 Input device

BEST MODE FOR CARRYING OUT THE INVENTION

A description will be given briefly below, with reference to FIG. 2 through FIG. 25.

First Embodiment of the Present Invention

Figure 2:
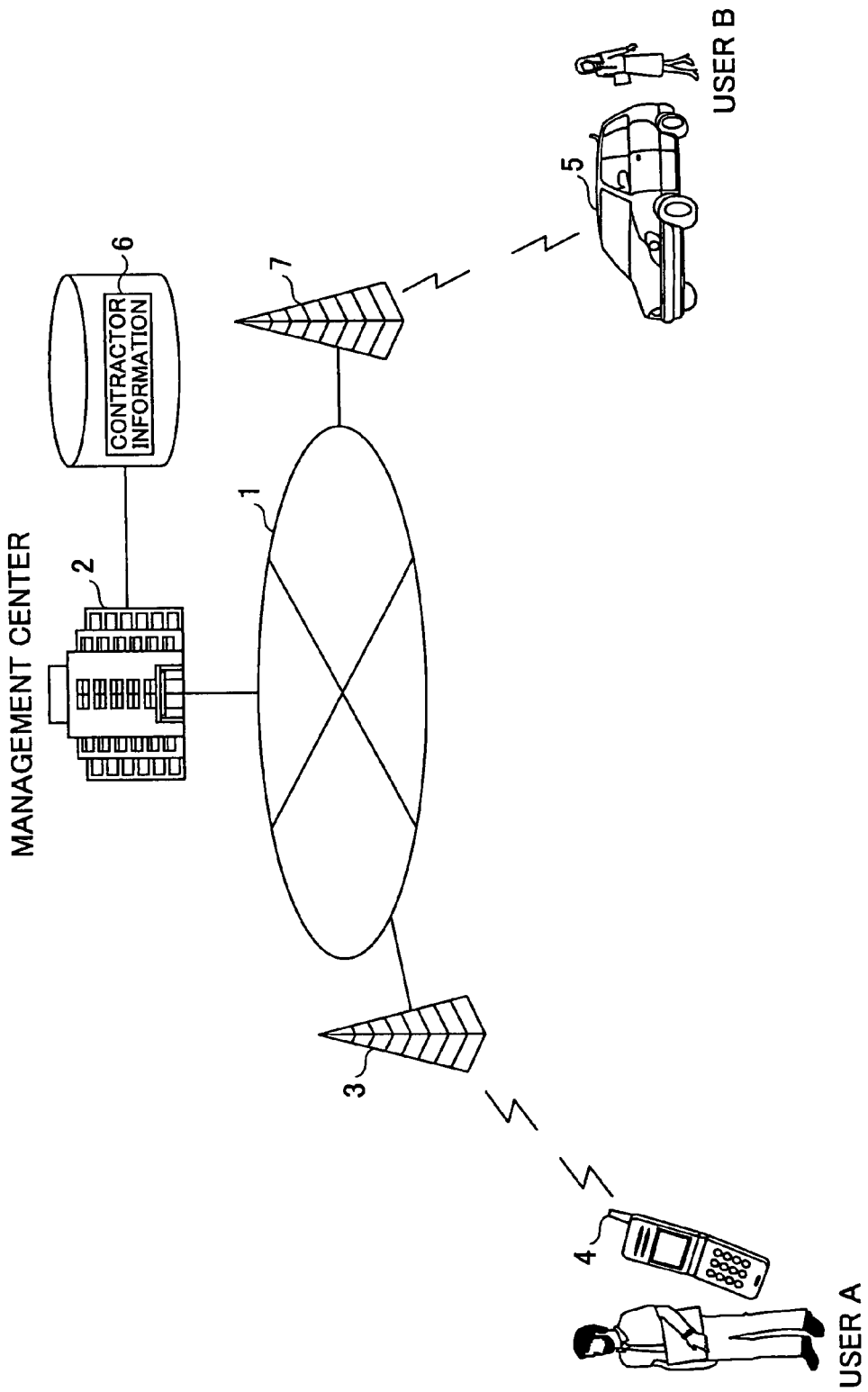
FIG. 2 is a schematic view showing the entirety of a system providing the vehicle information communication service.

FIG. 2 is a schematic view showing an entire system providing vehicle information communication service. The vehicle information communication service is provided by this system. The vehicle information communication system is composed of a management center 2, a vehicle 5, and an information terminal 4 via a network 1. The management center 2 provides various services such that information is obtained from the vehicle 5 via the vehicle 5 and the information terminal 4 or remote operations are performed on the vehicle 5 by the owner of the vehicle 5 (a user A or a user B). The vehicle 5 is owned by the user B. The information terminal 4 is used by the user A.

In the example shown in FIG. 2, the user A is a past driver of the vehicle 5 and a contractor of the vehicle information communication service. On the other hand, the user B is a party to whom the vehicle 5 is assigned from the user A and the present owner of the vehicle 5. While the owner generally means a party having a right for controlling the vehicle 5, the owner in embodiments of the present invention does not have such strict meaning. In the embodiments of the present invention, the owner means a person who can use the vehicle 5. In addition, a user in the embodiments of the present invention may mean the owner.

The management center 2 is connected to a network 1 such as the Internet. In addition, the vehicle 5 and the information terminal 4 can communicate with a base station 3 or 7 connected to the network 1 by radio communication or wire communication. For example, the base station 3 or 7 and the management center 2 are connected to each other by wire such as an optical fiber, PSTN (public switched telephone network), or ISDN (Integrated Service Digital Network). The base station 3 or 7 and the information terminal 4 or the vehicle 5 are connected to each other by radio such as a portable telephone network, a PHS (Personal Handy-phone System) network, a radio LAN, WiMAX (Worldwide Interoperability for Microwave Access), a satellite telephone, or Beacon. For sending and receiving data, a protocol such as TCP (Transmission Control Protocol)/IP (Internet Protocol) and a protocol such as HTTP (Hyper Text Transfer Protocol) having upward compatibility, FTP (File Transfer Protocol), or MIME (Multipurpose Internet Mail Extension) are used.

Next, the management center 2 is discussed. The management center 2 provides various services to the user A via the vehicle 5 and the user A (information terminal 4). Even if the vehicle 5 and the user A are separated from each other at a distance more than a designated distance, it is possible, by using the management center 2, to monitor illegal entry to the vehicle 5 by a third party or starting of the engine and report this to the owner of the vehicle 5 so that the owner of the vehicle 5 can operate the on-vehicle device of the vehicle 5. In addition, in a case where an air bag of the vehicle 5 is operated or an emergency switch is pushed, a signal is sent from the vehicle 5 to the management center 2 and thereby a designated process such as dispatch of a guard is implemented.

FIG. 3(*a*) is a hardware structure view of the management center 2 and FIG. 3(*b*) is a functional block view of the management center 2. The management center 2 functions a management server composed of a computer where a CPU 41, a ROM 42, a RAM 43, a storage device 44, a communication device 45, an NVRAM (Non Volatile RAM) 46, a drive device 47, or the like are mutually connected by a bus 38. The CPU 41 executes a program. The ROM 42 stores a program or a driver. The RAM 43 stores data or a program for a while. The storage device 44 is, for example, a HDD (Hard Disk Drive) 44 storing an OS (Operating System), a program, or a file. The communication device 45 such as a network card is used for connecting to the network. The NVRAM 46 stored a parameter and others. The drive device 47 reads from or writes in a recording medium such as a CD-ROM. In addition, contractor information 6 is stored in the storage device 44 of the management center 2. Information of the contractor of the vehicle information communication system is stored in the contractor information 6.

FIG. 3(*b*) is a functional block view of the management center 2. The management center 2 includes a transceiver part 11, a contractor confirming part 12 and an operations screen forming part 13. In addition, the management center 2 includes the contractor information 6 of the contractor of the vehicle information communication system.

The transceiver part 11 is a network interface communicating with the information terminal 4 and the vehicle 5 via the network 1. The transceiver part 11 sends forming information of the operations screen formed by the operations screen forming part 12 to the information terminal 4 and the vehicle 5. The transceiver part 11 sends an operations command for operating the on-vehicle device to the vehicle 5.

The contractor confirming part 12 confirms whether the user A or the user B is a contractor of the vehicle information communication service. The contractor confirming part 12 sends information for confirming the contractor of the vehicle information communication service, especially the contractor information of an individual contractor, to the vehicle 5. The user B getting in the vehicle 5 and seeing such information can recognize the fact that the vehicle 5 is a subject of the vehicle information communication service.

In other words, in a case where there is assignment of the vehicle 5 based on the bargain between the individuals and the vehicle 5 is a subject of the contract of the vehicle information communication service, the user B can recognize that there is a possibility that operations for obtaining the vehicle information such as a parking position of the vehicle 5 or operation of the on-vehicle device will be done by the user A.

The operations screen forming part 13 forms an interface with a user such as forming information of the operations screen displayed on the display device of the vehicle 5 or the information terminal 4 or a message for the user A or the user B. The forming information of the operations screen or the message is described at HTML (HyperText Markup Language), XML (eXtensible Markup Language), or the like and interpreted and displayed by a browser of the display device of the vehicle 5 or the information terminal 4.

A program for making the management server function as the operations screen forming part 12 and a vehicle assigning presumption part 13 is stored in a storage device of the management center 2. These functions are realized by the CPU 41 executing these programs.

FIG. 4 is a table showing an example of the contractor information 6, the information 6 being registered in the management center 2.

Since the user A has made a contract with the management center 2, the contractor information of the user A is registered. In the contractor information 6, a contractor ID provided for every contract at the time of making the contract, a user ID for identifying the user A, name, address, phone number, sex, and age are stored.

Not only address and others of the contractor shown in FIG. 4 but also information formed by processing the fact of usage of the vehicle information communication service, contents to be used, the contractor information 6, and others, are included in the contractor information 6.

A password for identifying the contractor by corresponding to the user ID is registered in the contractor information. For identifying the user A, biometric identification information such as a finger print, a sonogram, an outline of a face, iris, or venous arrangement may be used.

In a case where the user A accesses the management center 2 by using the information terminal 4, the contractor confirming part 12 request the user A to input the user ID and the password and identifies the user A based on conformity of input user ID and the password.

If the identified owner sees the operations screen of the information terminal 4 or the message and inputs the desirable operations, the operations signal sent from the information terminal 4 is sent to the management center 2 via a portable telephone network or the network 1. The management center 2 receives the operations signal sent from the information terminal 4 so as to interpret the contents of the operations, determine possibility of execution, and convert the signal to an operations signal that can be interpreted by the vehicle 5. The transceiver part 11 sends the operations signal to the vehicle 5.

The information terminal 4 is, for example, a portable telephone, a portable computer, a PDA (Personal Digital Assistant), a PHS (Personal Handyphone System), or the like. In other words, the information terminal 4 is any device which can be connected to the management center 2 via the network and by which operations requests to the management center 2 can be made.

Figure 5:
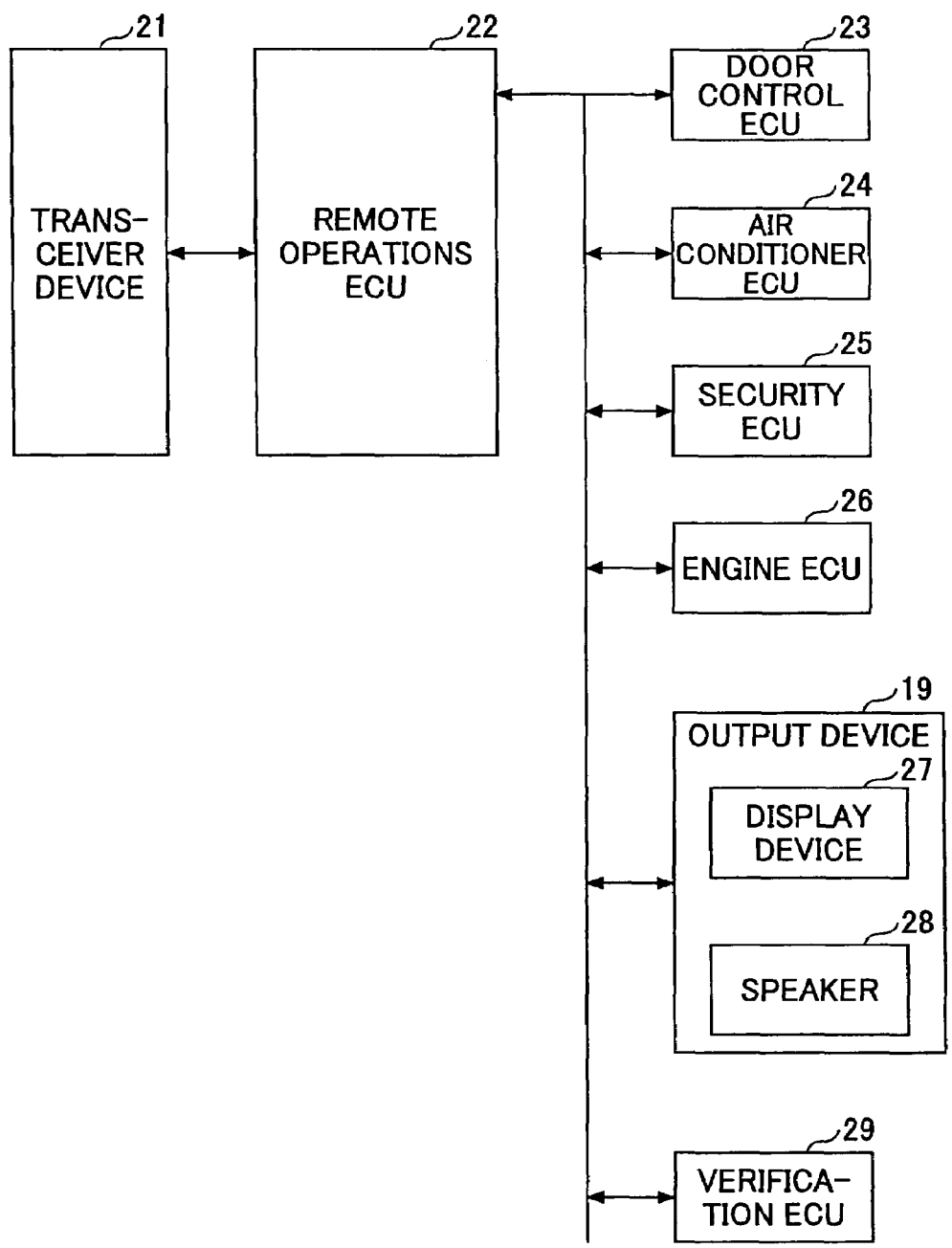
FIG. 5 is a block diagram of functions of a remote operations device of the vehicle.

Next, details of the vehicle 5 are discussed. FIG. 5 is a block diagram of functions of an on-vehicle device of the vehicle 5.

The vehicle 5 includes a transceiver device 21 and a remote operations ECU (Electrical Control Unit) 22. The transceiver device 21 receives the operations signal sent from the management center 2 and sends information of the vehicle or the result of operations corresponding to the operations signal to the management center 2. The remote operations ECU 22 controls the remote operations of the vehicle 5.

The remote operations ECU 22 is connected to and can communicate with various on-vehicle ECUs via a bus with a protocol such as CAN (Controller Area Network).

In an example shown in FIG. 5, the remote operations ECU 22 is connected to a door control ECU 23, an air conditioner ECU 24, a security ECU 25, an engine ECU 26, an output device 19, and a verification ECU 29. The door control ECU 23 controls opening and closing of a door or a window. The air conditioner ECU 24 controls air-conditioning based on temperature inside or outside the vehicle, setting temperature, or the like. The security ECU 25 detects vibration or entry to the inside of the vehicle which is parked. The engine ECU 26 detects a driving state of the engine so as to implement fuel jetting control, ignition timing control, or idling rotational speed control. The output device 19 includes a display device 27 configured to display an image, message or road map and a speaker 28 configured to output voice or sounds. The verification ECU 29 registers a key or verifies a key ID.

The verification ECU 29 manages a key registered in the vehicle 5. The verification ECU 29 follows a key verification step of an immobilizer and permits starting the engine if the key ID installed in a transponder of a key and a key ID managed by the verification ECU 29 are consistent with each other.

The on-vehicle device of claims include at least the transceiver device 21, the remote operations ECU 22, and the display 27 and also include an on-vehicle device necessary for control in order to call the attention of the operator in the embodiment of the present invention.

The transceiver device 21 receives the operations signal sent from the management center 2 by a receiving circuit so as to demodulate the operations signal. The demodulated operations signal is sent to the remote operations ECU 22. The remote operations ECU 22 determines the contents of the operations so as to communicate with a designated ECU based on the result of determination. Each of the ECUs communicates with the remote operations ECU 22 and sends a state of the corresponding on-vehicle device to the remote operations ECU. Each of the ECUs also drives an actuator corresponding to a control signal from the remote operations ECU 22 and controls the designated on-vehicle device such as locking a door.

The display device 27 is a display made of liquid crystal or an organic electroluminescence material, a HUD (Head Up Display), or the like. The display device 27 displays an operations menu, traffic information, road map, a route to an object place, or the like. A touch panel may be provided on the display apparatus 27 so that operations can be input. The speaker 28 outputs voice just before the vehicle reaches a turning-right or turning left point of a road guided by the car navigation 30. The display device 27 and the speaker 28 is used for output of media such as a television or radio, a music player, or DVD (Digital Versatile Disk) player.

In addition, in a case where the management center 2 confirms whether the user B is an owner of the vehicle 5, the remote operations ECU 22 displays the message sent from the management center 2 on the display part 28 and the voice is output from the speaker 28.

The vehicle 5 has a GPS (Global Positioning System) device so that the present position of the vehicle can be detected. For example, in a case where the contractor of the vehicle information communication service wishes to know a position of the vehicle 5 from a separated place, it is possible to display the position together with a map on the screen of the information terminal 4 by operating the information terminal 4.

Next, the contractor confirming part 12 explains steps for making the user B recognize that the vehicle 5 is a contract subject of the vehicle information communication service. As discussed with reference to FIG. 1, it is assumed that the vehicle 5 is assigned from the user A to user B while the contractor of the vehicle information communication service is still user A.

Figure 6:
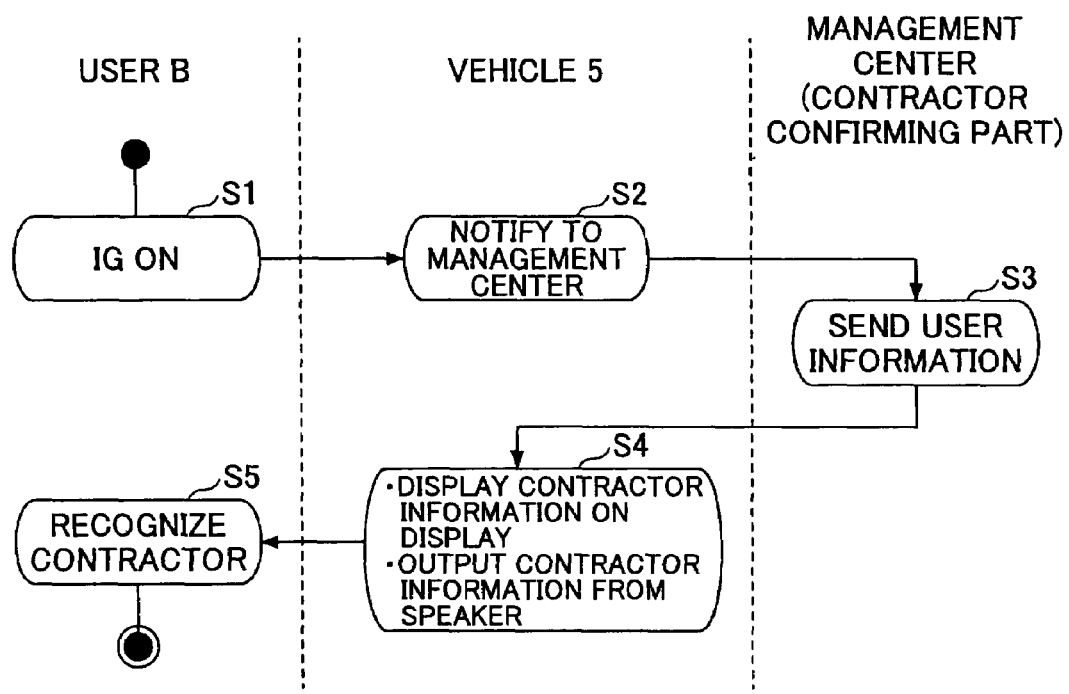
FIG. 6 is a timing chart showing a flow of sending a name or the like of a user A to a user B in a case where the user B gets in the vehicle.

FIG. 6 is a timing chart showing a flow of sending a name or the like of the user A to the user B in a case where the user B gets in the vehicle.

When the user B gets in the vehicle 5 and starts the engine, the ignition is turned on (S1). The vehicle 5 notifies the contractor confirming part of the management center that the ignition is turned on (S2).

When the contractor confirming part 12 receives notification indicating that the ignition is turned on, the contractor confirming part 12 extracts the name or the like of the user A from the contractor information 6 and sends it to the vehicle 5 (S3). When the vehicle 5 receives the name or the like of the user A, it is output from the speaker 28 while it is being displayed on the display device 27 (S4).

Figure 7:
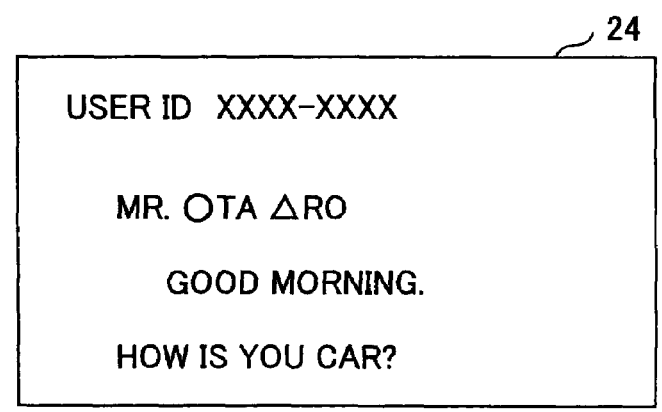
FIG. 7 is a view showing an example of the contractor information, of the user A, displayed on a display device.

FIG. 7 is a view showing an example of the contractor information, of the user A, displayed on the display device 27. The name and the user ID of the user A are displayed on the display device 27 of the vehicle 5. In addition, in order to prevent giving the impression of confirmation of the contractor, a message of "How is your car?" is displayed. It is preferable to change the message based on season or time. Other than the name, a phone number, address, or the like of the user A may be displayed.

The user B can recognize that the contractor is still the user A in a visual or audible manner, namely contents of display of the display device 27 or the voice being output from the speaker 28 (S5).

On the display device 27, following the contractor information, a simple explanation of the vehicle information communication service may be displayed. Because of this, it is possible for the user B to know the contents of the vehicle communication service so as to recognize the possibility that the user A can obtain information of the vehicle such as a parking position of the vehicle 5.

The user B recognizes that the contractor is still the user A so as to know about possibility that the user A can do illegal activity and ask the management center 2 to remake a contract of the vehicle information communication service or exclude remote operations by the user A.

In addition, the contractor information is displayed by, as a trigger, turning on the ignition, namely operations done whenever the vehicle 5 is driven. Therefore, it is possible to confirm the contractor without requesting excessive operations by the user B so that the user B may not feel annoyed. If the ignition is turned on several times a day, it is preferable to limit to displaying the contractor information, for example, to once a day.

While the contractor information is displayed at the time when the user B gets in the vehicle 5 in the example shown in FIG. 6, the contractor information may be displayed during the time user B is in the vehicle 5.

Figure 8:
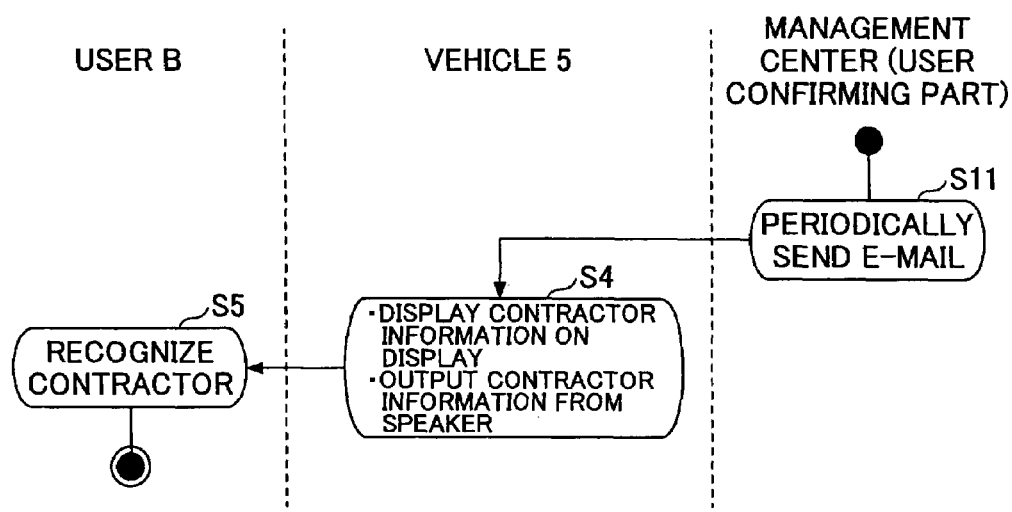
FIG. 8 is a timing chart showing a flow of periodically sending the name or the like of the user A to the user B.

FIG. 8 is a timing chart showing a flow of periodically sending the name or the like of the user A to the user B.

The management center 2 periodically (for example, every week or every month) sends e-mail or the like indicating a method for practically using the vehicle information communication service or new service to the vehicle 5 (S11). Based on periodic sending of the e-mail by the management center 2, the contractor confirming part 12 sends the contractor information to the vehicle 5.

After this, as well as the example shown in FIG. 6, the name or the like of the user A is displayed on the display device 27 (S4), and the user B can recognize that the contractor is still the user A in a visual or audible manner, namely contents of display of the display device 27 or the voice being output from the speaker 28 (S5).

By the contractor confirming part 12 periodically displaying the contractor information, the user B can recognize that the contractor is still the user A. In addition, since the contractor information is periodically displayed, there is less nuisance than a case where the contractor information is displayed whenever the ignition is turned on. Therefore, a general user who is not an assignee of the vehicle may not feel annoyed.

Furthermore, display of the contractor information 6 may not be done periodically. Display of the contractor information 6 may be done in a case where there is no access from the user A or the user B to the management center 2 for a certain amount of time. Since the management center 2 records access history for every contractor, in a case where a certain time such as one month passes after the last access, the contractor confirming part 12 displays the contractor information on the display device 27 and outputs the contractor information from the speaker 28.

In the case where there is no access from the user A or the user B to the management center 2 for a certain amount of time, it can be determined that the vehicle information communication service may not be in use. Therefore, it can be presumed that the vehicle 5 is assigned from the user A to the user B and it can be also presumed that the user B does not recognize that the vehicle 5 is a subject of the vehicle information communication service. Therefore, by sending the contractor information to the user B in the case of no access, it is possible to make the user B recognize the contract of the vehicle information communication service.

In addition, if there is access from the information terminal 4 of the user A to the management center 2, the contractor information may be sent to the user B.

Figure 9:
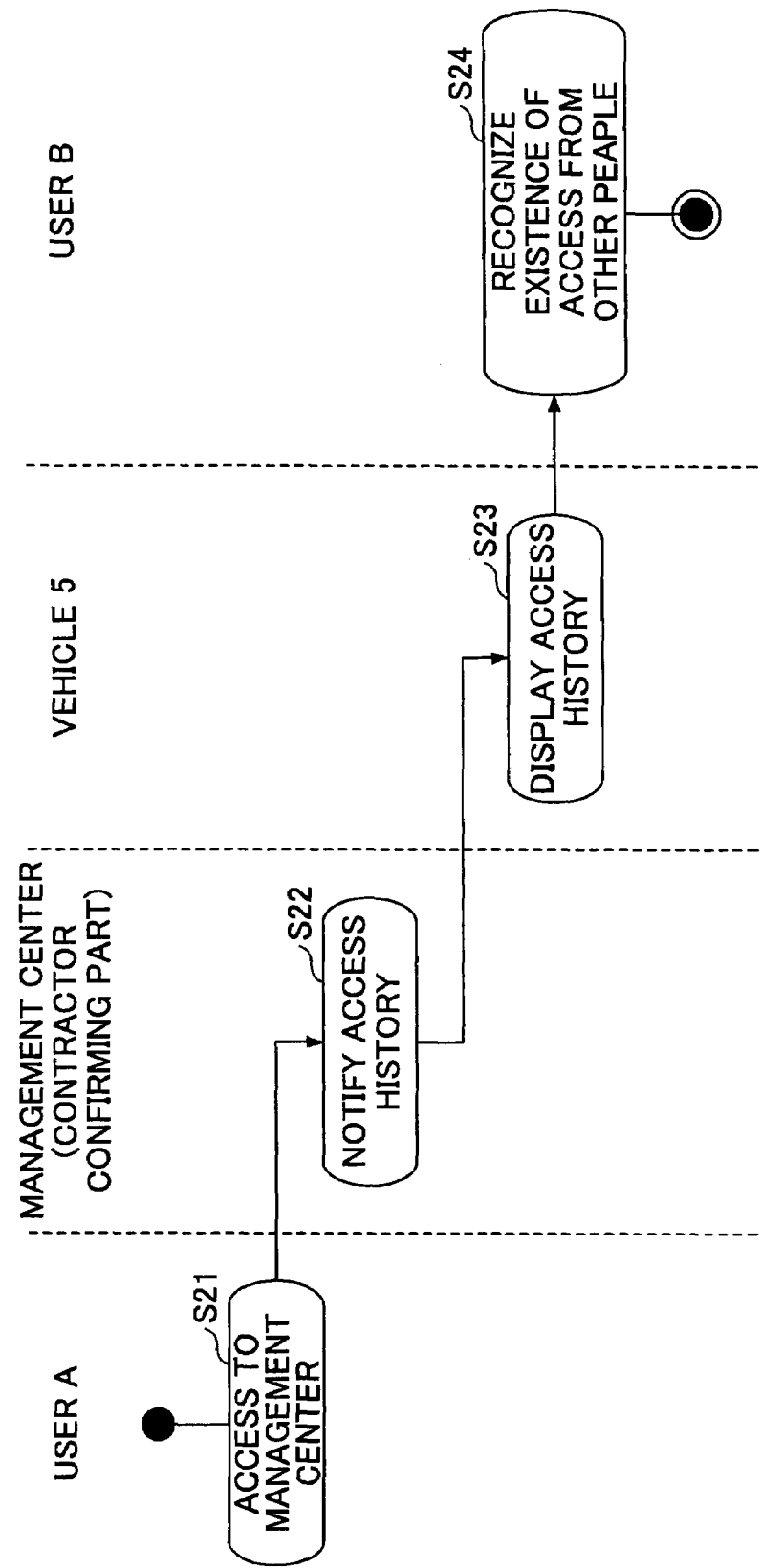
FIG. 9 is a timing chart showing a flow of sending the name or the like of the user A to the user B in a case where the user A accesses the management center.

FIG. 9 is a timing chart showing a flow of sending the name or the like of the user A to the user B in a case where the user A accesses the management center 2.

A password or ID peculiar to the information terminal 4 is input from the user A operating the information terminal 4 so that access to the management center 2 is made (S21). Since the contractor of the vehicle information communication service is not changed, the management center 2 confirms the user A so that the user A can obtain a parking position of the vehicle 5 and do remote operations of the on-vehicle devices.

The contract confirming part 12 of the management center 2 reports the access to the vehicle 5 (S22). The report about the access may be made to the information terminal of the user B. In this case, even if the user B does not get in the vehicle, the user B can recognize the fact of the access by the user A.

The vehicle 5 displays the fact of the access on the display device 27 and outputs it to the speaker 28 (S23). Because of this, the user B can recognize the access from other people to the management center 2. In addition to the fact of the access, the contractor information of the user A may be displayed on the display device 27 or output from the speaker 28.

By recognizing the fact of the access from other people, the user B can recognize that the vehicle 5 is a subject of the contract of the vehicle information communication service and the user A does the remote operations so as to obtain the information of the vehicle such as a parking position or operate the on-vehicle devices. In addition, when the access from the user A is made, the fact of the access from the user A is displayed to the user B. Therefore, a normal user to whom the vehicle is not assigned may not feel annoyed.

According to the first embodiment of the present invention, by reporting the contractor information of the contractor to the user B at various timings, it is possible to make the user B recognize that the vehicle 5 is a subject of the contract of the vehicle information communication service and it is also possible to prevent the user A from doing illegal activities to the user B or the vehicle.

Second Embodiment of the Present Invention

Figure 10:
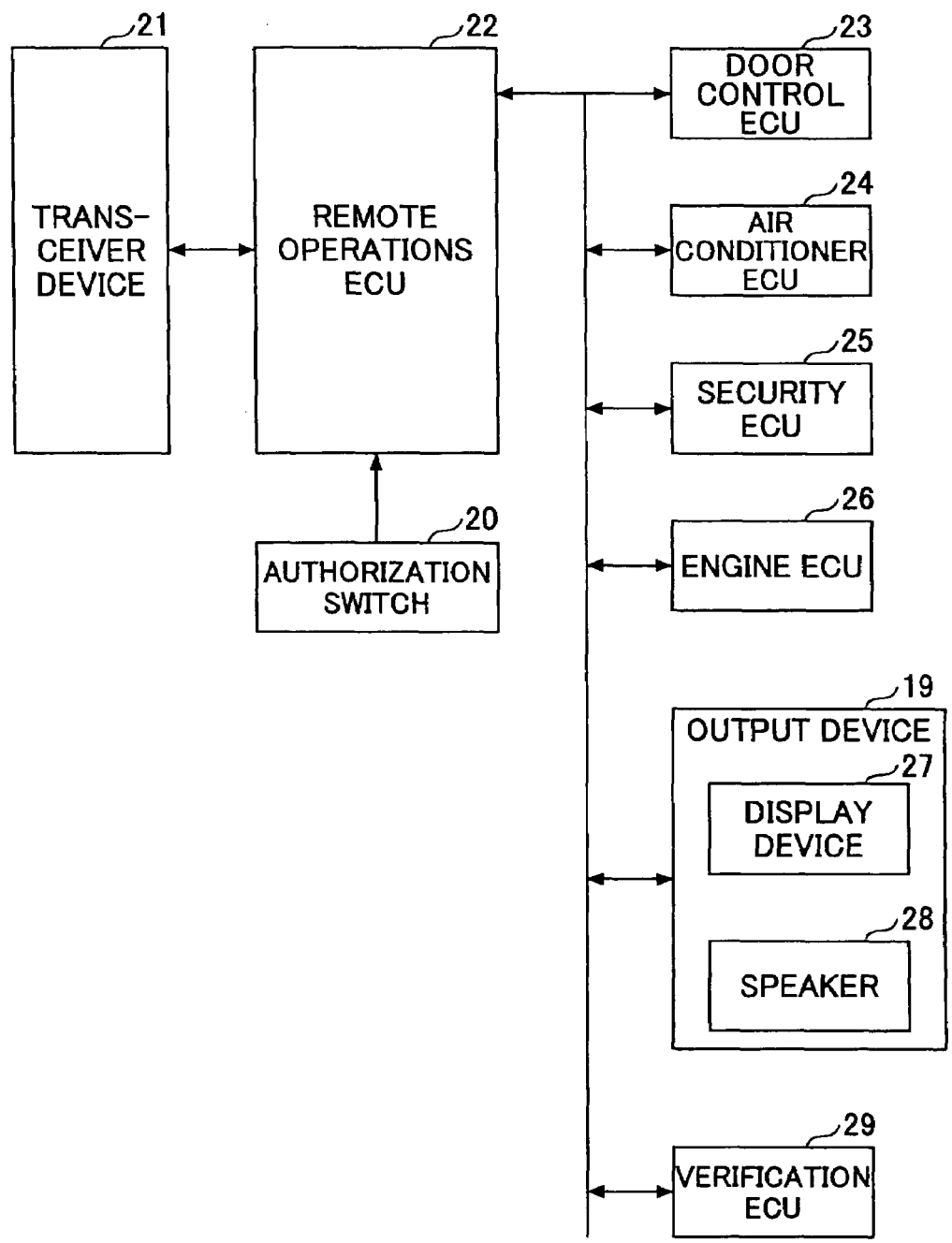
FIG. 10 is a block diagram showing functions of a remote operations device of a vehicle, of a second embodiment of the present invention.

In a second embodiment of the present invention, by setting the usage of the vehicle information communication service based on authorization of the user B, it is also possible to prevent the user A from doing illegal activities affecting the user B or the vehicle. FIG. 10 is a block diagram showing functions of a remote operations device of a vehicle, of the second embodiment of the present invention. In FIG. 10, parts that are the same as the parts shown in FIG. 5 are given the same reference numerals, and explanation thereof is omitted.

An example shown in FIG. 10 is different from the example shown in FIG. 5 in that an authorization switch 20 corresponding to a remote operations authorization part of claims is provided in the on-vehicle device 23. The authorization switch 20 is a switch for authorizing usage of the vehicle information communication service by the user A or the user B. The authorization switch 20 is displayed on a touch panel if necessary or is provided at a center cluster. When the authorization switch 20 is operated (pushed), it is possible to make remote operations from the information terminal 4 so that the management center 2 can obtain the information of the vehicle such as the parking position or operate the on-vehicle devices 23.

In a case where the authorization switch 20 is not operated, after the user A accesses the management center 2, the management center 2 communicates with the vehicle 5 and determines whether the authorization switch 20 is operated. If it is determined that the authorization switch 20 is not operated, remote operations by the user A are not permitted. In the case where the authorization switch 20 is not operated, when the user A accesses the management center 2, the management center 2 may display the fact that the remote operations of the vehicle 5 are not permitted on the information terminal 4.

Therefore, if not only the user A who made contract but also the user B does not operate the authorization switch 20, the remote operations from the information terminal 4 cannot be done.

If the user B does not know the existence of the vehicle information communication service or the fact that the vehicle 5 is a subject of the contract, the user B does also not know the operations of the authorization switch 20. Therefore, the authorization switch 20 is not operated and it is possible to prevent the user A from doing an illegal activity affecting the user B or the vehicle 5 without the user B knowing.

The authorization switch 20 may be composed of an independent switch or may be provided so as to be operated together with operations of other on-vehicle devices. In a case where the authorization switch 20 is operated together with operations of other on-vehicle devices, it is preferable to use the on-vehicle device operated in a case where the vehicle parks, so that the authorization switch 20 is turned on by, for example, applying brakes more than usual or turning on a hazard lamp twice.

If operation of the authorization switch 20 for implementing the remote operations is always required, while the illegal activity of the user A can be prevented, a normal user using the vehicle information communication service may feel annoyed. Because of this, it is preferable that, for example, a day when the operations switch 20 is operated is stored in the management center 2 or the vehicle 5; and remote operations can be done by the information terminal 4 without requiring the operation of the authorization switch 20 for a certain period of time such as one month from the day when the authorization switch 20 is operated.

If the remote operations for a certain period of time from the operation of the authorization switch 20 are permitted, a normal user of the vehicle information communication service can do the remote operations once for a certain period of time by only operating the authorization switch 20. In this case, since the user B does not know the operations of the authorization switch 20, it is possible to prevent the illegal activity of the user A.

In addition, the authorization of the user B may not be implemented by the authorization switch 20. For example, in the vehicle information communication service, at the timing of renewal of the contract of every month or every year, a confirmation e-mail about contract continuing or a goods questionnaire is sent to the vehicle 5 or the information terminal 4. For example, the management center 2 inquires about the existence of authorization of the remote operations for the user B by using the confirmation e-mail or the like so that the response from the user B can be the authorization of the remote operations. Since input of the questionnaire or the renewal of the contract is not an independent operation for authorization of the remote operations, it is possible to obtain the authorization without annoying the normal user.

In addition, since it is possible for the user B to recognize, by sending the questionnaire or the renewal of the contract, that the vehicle 5 is a subject of the contract of the vehicle information communication service, it is possible to prevent the illegal activity of the user A.

Thus, according to the second embodiment of the present invention, by setting the remote operations in the vehicle information communication service based on authorization of the user B, it is also possible to prevent the user A from doing illegal activities affecting the user B or the vehicle.

Third Embodiment of the Present Invention

In a third embodiment of the present invention, it is possible to prevent the user A from doing an illegal activity affecting the user B or the vehicle 5, by providing an expiration date to a password required when access from the information terminal 4 to the management center 2 is made.

FIG. 11 is a table showing an example of contractor information, of the third embodiment of the present invention. An example shown in FIG. 11 is different from the example shown in FIG. 4 in that the expiration date is provided. Since the access to the management center 2 cannot be made by the password which expires, it is possible to prevent the user A from doing illegal activities affecting the user B or the vehicle.

In addition, in the third embodiment of the present invention, regardless of expiring of the effective term, permission or authorization of the user B is necessary for changing the password. As a result of this, it is possible to prevent the user A from renewing the password without the user B knowing about this.

Permission or authorization by the user B on the renewal of the password may be a response to a message asking permission for renewal of the password displayed on the display device 27 of the vehicle 5 or may be a password change mode implemented by user B pushing a designated operations button of the vehicle 5.

Since the operations of the vehicle 5 upon the renewal of the password are required, in a case where the driver (user B) of the vehicle 5 is different from the contractor (user A), the password cannot be changed without authorization of the driver of the vehicle 5. Therefore, it is possible to prevent the user A from renewing the password without the user B knowing about this and it is also possible to prevent the user A from doing illegal activities affecting the user B or the vehicle.

According to the third embodiment of the present invention, by setting the expiration date for the password, it is possible to prevent the user A from doing illegal activities affecting the user B or the vehicle.

Thus, even if the contractor of the vehicle information communication service assigns the vehicle, it is possible to prevent the contractor from doing illegal act affecting the assignee or vehicle. The user B who is an assignee of the vehicle 5 may recognize the existence of the contract by the displaying of the name of the contract or the like. The remote operations may be based on the authorization of the user b. In addition, the expiration date may be provided for the password and the remote operations may be limited by requiring authorization of the user B on the renewal of the password. The first through third embodiment may be combined.

Fourth Embodiment of the Present Invention

In a fourth embodiment of the present invention, a vehicle information communication system whereby the user B is made recognize that the vehicle 5 is a subject of the contract of the vehicle information communication service by using a position where the access is made from the information terminal 4 to the management center 2, is provided.

Figure 12:
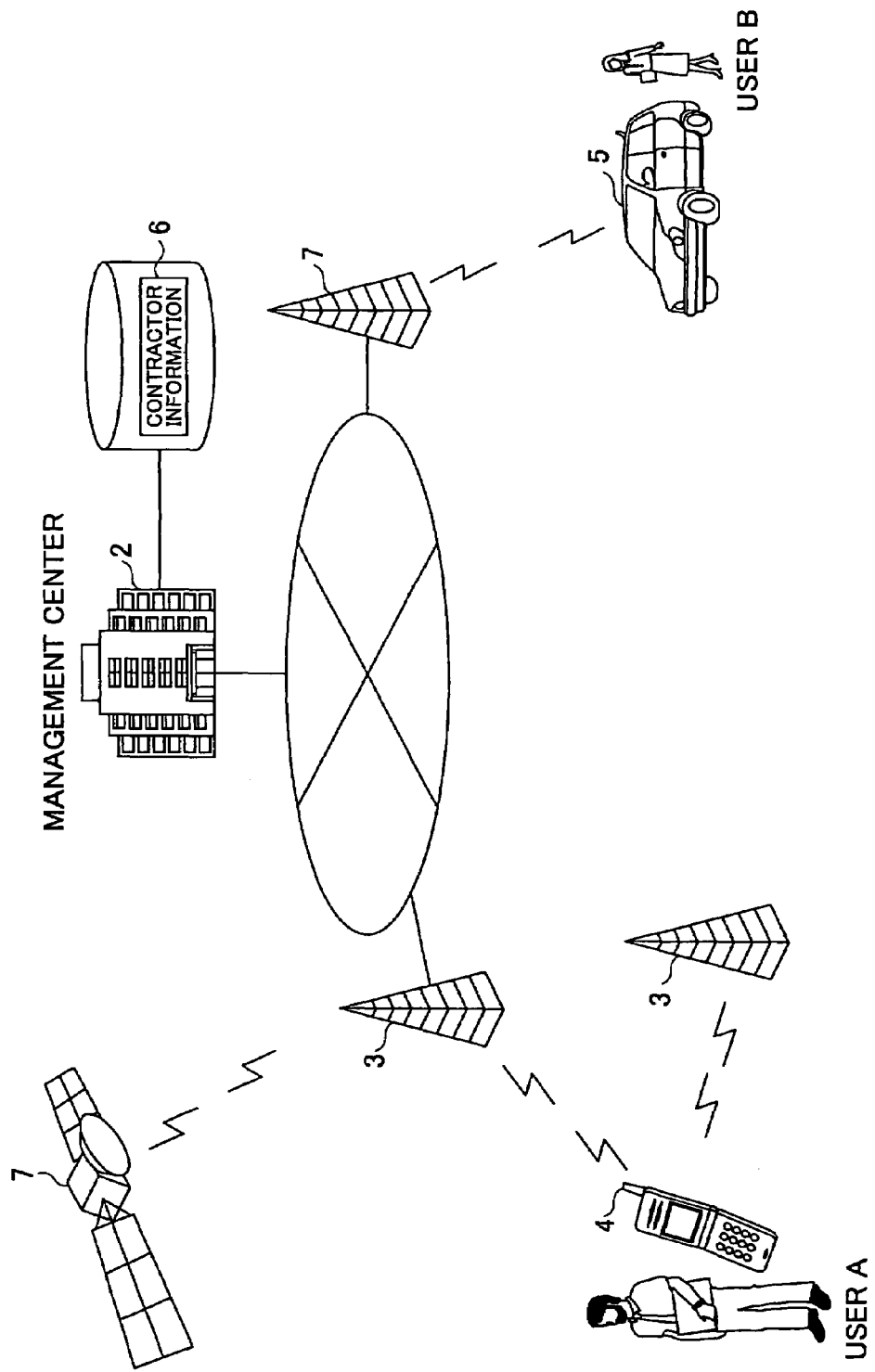
FIG. 12 is a schematic view showing the entirety of a vehicle information communication service, of a fourth embodiment of the present invention.

FIG. 12 is a schematic view showing an entirety of the vehicle information communication service, of the fourth embodiment of the present invention. In FIG. 12, parts that are the same as the parts shown in FIG. 2 are given the same reference numerals, and explanation thereof is omitted. In the example shown in FIG. 12, the management center 2 can obtain the position information indicating a rough position of the information terminal 4. The position information may be obtained by any way and the position information may not be required to have high precision.

In a case where the information terminal 4 obtains the position information of the information terminal 4, the electric field strength of an electric wave received by the base station 3 is used or a GPS satellite 7. In the case where the electric field strength of an electric wave received by the base station 3 is used, designated operation are periodically applied to the information terminal 4 so that the information terminal 4 measures the electric field strength of plural neighboring base stations and sends the electric field strength to a position measuring server provided by an information terminal company corresponding to each of the base stations. As the base station is closer to the information terminal 4, stronger electric field strength is provided. Therefore, a position measuring server can calculates the position of the information terminal 4 in advance based on the position of the base station and the electric field strength. In addition, even if there is only a single base station where the information terminal 4 can be connected, it is possible to calculate that the information terminal 4 is in a designated area from the base station. The position measuring server sends the calculated position information to the information terminal 4.

In the case where the GPS satellite 7 is used, the information terminal 4 may detect the position, as well as the car navigation of the vehicle 5 or by using the electric field strength from the base station together. In other words, in a case where electric waves from four or more GPS satellites can be received, the present position is detected based on arrival time of the electric wave sent from four GPS satellites 7. In a case where electric waves from one through three GPS satellites can be received, in addition to the arrival time of the electric waves from the GPS satellites 7, the electric field strength from the base station is also used. Because of this, even if the number of the received GPS satellites 7 is not sufficient, it is possible to detect the position. Detection of the position based on a reaching distance of the electric waves from the GPS satellites 7 causes a large workload on the information terminal 4 and therefore may be done by a position measuring server.

The management center 2 requires the information terminal 4 to send the position information when the information terminal 4 accesses. The management center 2 extracts a position from which the information terminal 4 accesses, from map data, for example, so as to send it to user B or the vehicle 5 in a manner that the user B can easily recognize.

Furthermore, the management center 2 may directly obtain the position information of the information terminal 4. The management center 2 can use the position of the base station itself where the user A accesses the position of the information terminal 4 as position information. Since the information terminal 4 is in a reaching area of the electric wave from the base station such as an area of radius 50 through 500 m, it is possible to specify a rough position of the information terminal 4. An accessed base station or an access time is recorded in a connection record of a phone company. Therefore, it is possible for the management center 2 to obtain the information of the base station to which the information terminal 4 accesses, at the time of the access or after the time of the access.

In addition, as the position information, an IP (Internet Protocol) address of a server to which the information terminal 4 accesses may be used. In a case where the Internet is used as the network 1, a server of the management center 2 receives notification of the IP address of a connecting opponent server. Since the IP address is registered in a DNS (Domain Name System) server corresponding to a host name, the host name of the opponent server can be know if the IP address can be known. The host name contains a domain name. It is possible to specify the owner of the opponent server by this so that a rough physical position can be found by a normal service provider.

Figure 13:
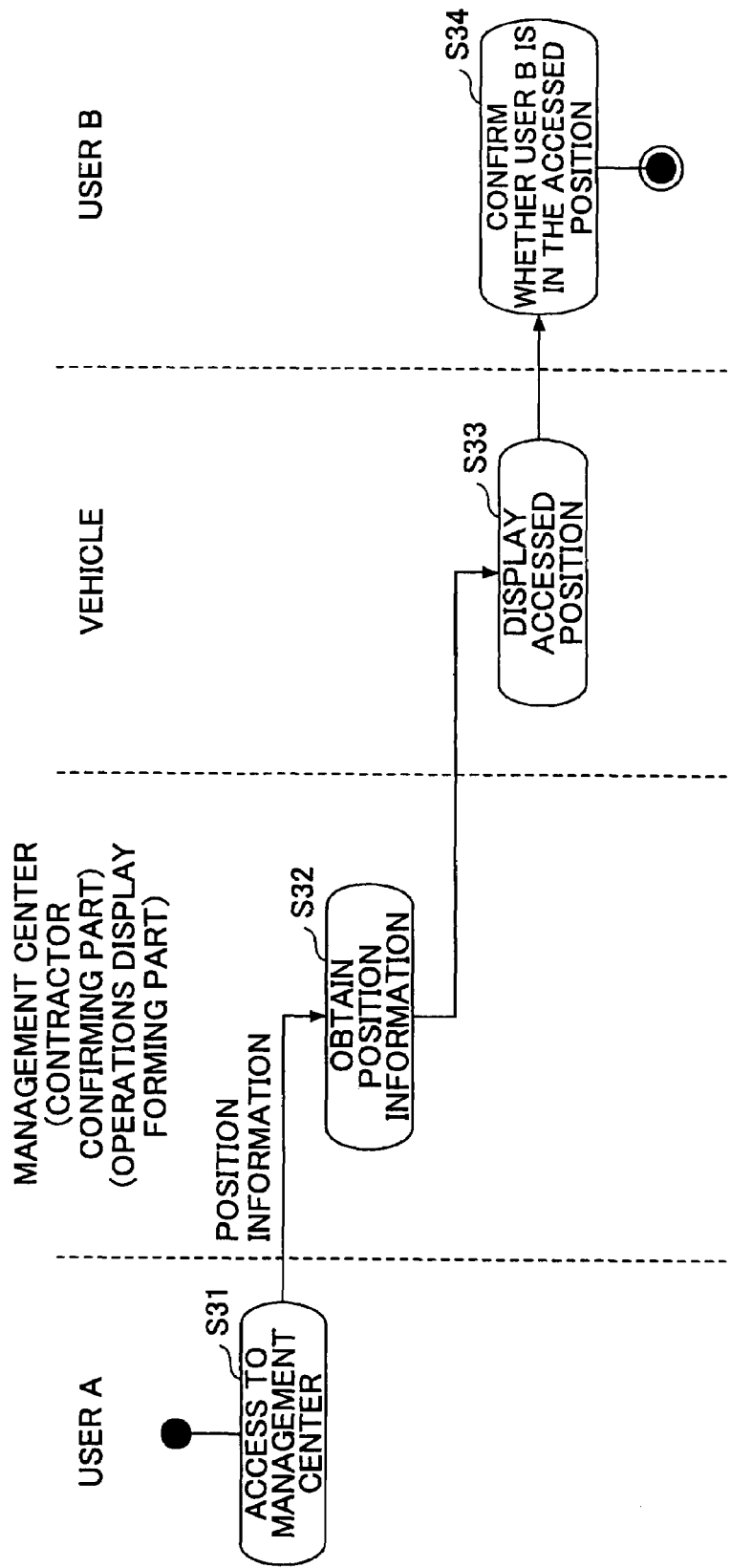
FIG. 13 is a timing chart showing a flow of sending position information of an information terminal to the user B in a case where the user A accesses to the management center.

FIG. 13 is a timing chart showing a flow of notifying position information of an information terminal 4 to the user B in a case where the user A accesses to the management center 2.

First, a password or an ID peculiar to the information terminal 4 is input by the user A operating the information terminal 4 so that access to the management center 2 is made (S31). Since the contractor of the vehicle information communication service is not changed, the management center 2 certifies the user A and user A can obtain the parking position of the vehicle 5 or do remote operations of the on-vehicle devices.

The contractor confirming part 12 of the management center 2 obtains the position information of the information terminal 4. In a case where the position information is sent from the information terminal 4, the position information is used. In a case where the position information is not sent from the information terminal 4, position information directly obtained by the management center 2 is used. Furthermore, in a case where the user A refuses the sending requirement of the position information from the management center 2, this is recorded together with the access time. The contractor confirming part 12 of the management center 2 sends the position information to the vehicle 5 (S32). The position information may be directly sent to the information terminal or the like of the user B. In this case, even if the user B does not get in the vehicle, the user A recognizes an accessed position and the fact of the access.

For example, in a case where the ignition is turned on, the vehicle 5 displays or outputs the fact of the access and the position information on the display device 27 or from the speaker 28 (S33). FIG. 14(a) shows an example of position information displayed on the display device 27. In the example shown in FIG. 14(a), message of "There is access from a position indicated by a star mark ○○ city ○." and access position indicated by a star mark in a map are displayed. These may be displayed together with the position of the vehicle 5.

Since the vehicle information may not be accurate such that electric waves of the designated number of the GPS satellites are not received, the vehicle position may be displayed with a designate range such as a circular area or rectangular area. In addition, together with the position information, or separated from the position information, day and time of the access may be displayed. Since the accessed day and time are recorded in the management center 2, it is possible to easily display the day and time. FIG. 14(b) shows an example of the accessed day and time displayed on the display device 27. In the example shown in FIG. 14(b), message of "There is access from a position indicated by a star mark, ○○ city ○, at XX (time) on ○○ (day)" and access position indicated by a star mark in a map are displayed.

Because of this, the user B recognizes a position at the time when the user B accesses to the management center 2 and can confirm whether the user B is in the accessed position (S34). If the user B has no memory that the user B has been in the position, the user B can recognize that there has been access from a person other than the user B; the vehicle 5 is a subject of the vehicle information communication service; and the user A does remote operations so as to obtain the information of the vehicle such as the parking position or operate the on-vehicle devices.

[Modified Example of Display Timing]

In the above mentioned embodiments of the present invention, the position information is sent to the user B every time when access is made by the user A and user B. In other words, even if there is no bargain of the vehicle 5 between the individuals, whenever the remote operations are made, the accessed position is displayed and it may be annoyed. Because of this, a place where the user B frequently goes (hereinafter "registered position") is registered in the management center 2 or the vehicle 5. Only when the access is made from a position other than the registered position, notification is sent to the user B. The registered position is, for example a home, parking lot, a work place, or the like.

FIG. 15 is a table showing an example of the contractor information 6 of the fourth embodiment of the present invention. In FIG. 15, parts that are the same as the parts shown in FIG. 6 are given the same reference numerals, and explanation thereof is omitted. As shown in FIG. 15, as the registered position, a home, a parking lot and a working place are registered in the contractor information 6 and corresponding coordinate information such as latitude, longitude, and height above sea level are recorded.

FIG. 16 is a timing chart showing a flow of position information of the information terminal 4 to the user B with reference to a registered position in a case where the user A accesses to the management center. In FIG. 16, parts that are the same as the parts shown in FIG. 13 are given the same reference numerals, and explanation thereof is omitted.

While steps in FIG. 16 wherein the management center 2 obtains the position information are the same as the steps in FIG. 13, whether the accessed position corresponds to the registered position is determined in the example shown in FIG. 16. Only if the accessed position does not correspond to the registered position, a position accessed by the user B is displayed (S33). If the accessed position corresponds to the registered position, the management center 2 records the access history and finishes as it is (S35). As discussed above, since the position information is not always accurate, whether the accessed position corresponds to the registered position is determined with a designated degree of accuracy.

Thus, only when the access is made from a position other than a place where the user B frequently goes, notification is made to the user B. Therefore, it is possible to prevent the user B from feeling annoyed. If the user B desires, the access history recorded in step S35 is shown to the user B. Therefore, later, the user B can confirm whether the user B is in a position where the access is made.

In this embodiment as well as other embodiments, the day and time when the access is made can be displayed with or separately from the position information. In other words, since day and time when the access is made is recorded in the management center 2, the contractor confirming part 12 makes statistics of recent (for example, one month) access time in advance and can extract a time when access is frequently made as a time for accessing. In a case where access is made at a midnight or a time 2 hours or more different from the time when access is frequently made, the time is notified to the user B. For example, in a case where access is made at 2 o'clock after midnight while access to the management center 2 is frequent before and after 8 o'clock in the morning and before and after 9 o'clock in the evening, the contractor confirming part 12 sends notification indicating the fact of the access and a time to the user B.

Thus, notification is sent to the user B only if the access is made at a time when the user B does not usually access. Hence, it is possible to prevent the user from feeling annoyed.

If the access is made from a place other than the registered position or at the time when access is not frequently made, notification may be sent to the user B every time. However, the notification is made to the user B in a lump for every week or every month.

In this modified example, when the access is made from the information terminal at the access position or time different from normal, namely a designated state, the user B can confirm whether the user B is a contractor.

[Modified Example of the Display Contents]

While only the access position or time is displayed in the example shown in FIG. 14, details of the access information can be sent to the user B. For example, a time stamp as the access time, identification information of the accessing information terminal 4, or the operations contents is used.

FIG. 17(*a*) is a view showing an example of details of access information displayed on the display device 27. Access time is a time when the user A accesses and is measured by a clock of the management center 2. Time stamp indicates the fact that the management center 2 is authorized at the access time by a time stamp station or a time of the authorization. Access mobile is identification information for identifying the information terminal 4 and is, for example, a portable phone number, a serial number of the information terminal 4, an ID peculiar to a processor, or the like. Access position is the above-discussed position information. As the access position, address as a position on the map is displayed together with latitude, longitude, and height above sea level. Operations contents indicate contents of the operation implemented by the user A. In the example shown in FIG. 15, as the operations contents, the fact that a position of the vehicle 5 is obtained is displayed.

Thus, by sending the access state to the user B in detail, it is possible to report the influence of the access by the user.

[Real-Time Display]

In the above-discussed embodiments, after the access by the user A, the fact of the access other than the access from the registered position or normal access time is made or access recording for a designated time period is sent to the user B. However, this may be displayed in real time.

Figure 18:
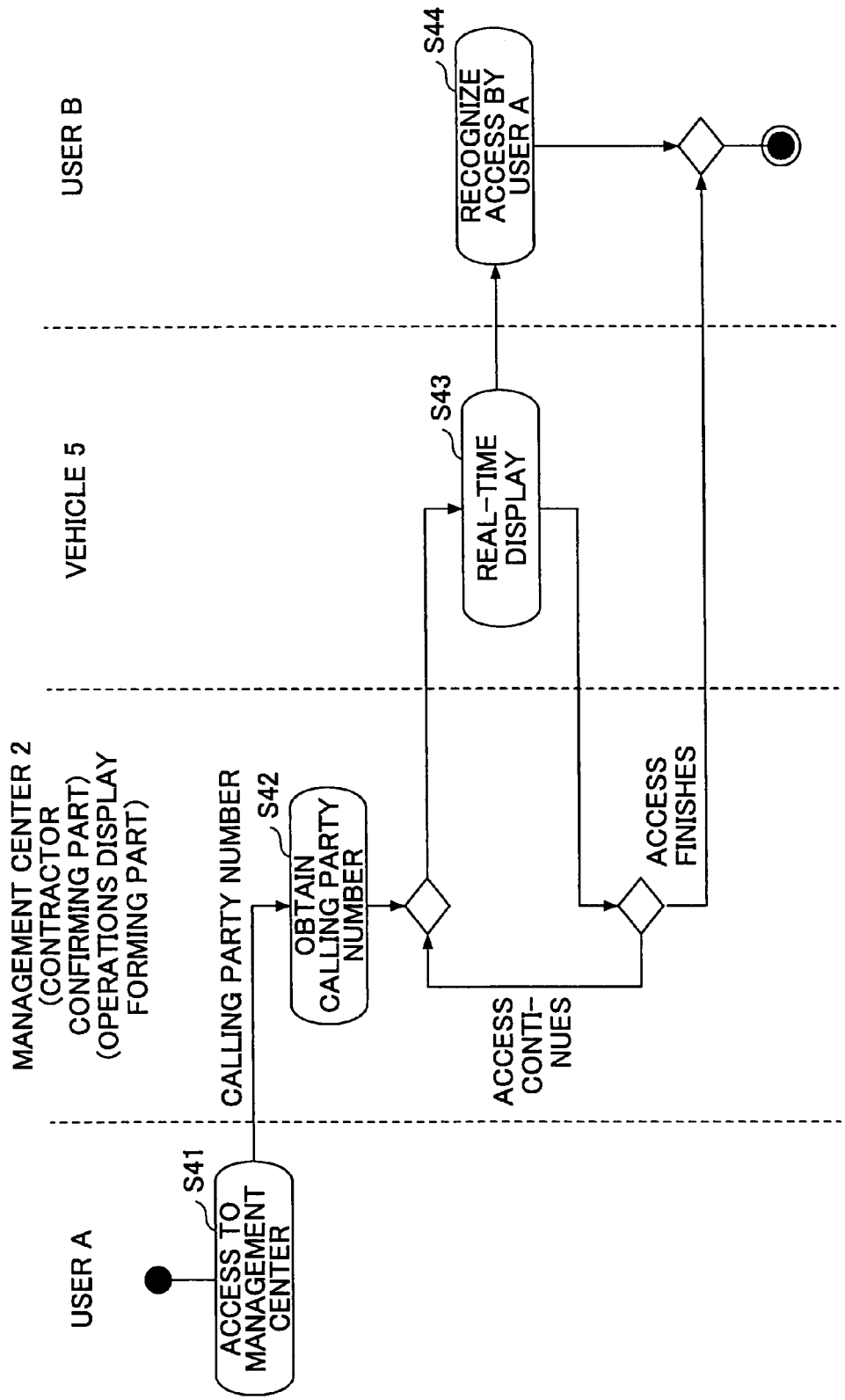
FIG. 18 is a timing chart showing a flow of a calling party number to the user B in real time in a case where the user A accesses the management center.

FIG. 18 is a timing chart showing a flow of a calling party number to the user B in real time in a case where the user A accesses the management center.

First, a password or an ID peculiar to the information terminal 4 is input by the user A operating the information terminal 4 so that access to the management center 2 is made (S31). Since the contractor of the vehicle information communication service is not changed, the management center 2 certifies the user A and user A can obtain the parking position of the vehicle 5 or do remote operations of the on-vehicle devices.

The contract confirming part 12 of the management center 2 obtains the calling party number of the information terminal 4 or an ID peculiar to the information terminal 4 (S42). In a case where the information terminal 4 is set so as to refuse sending the calling party number or the ID peculiar to the information terminal 4, a telephone number or the like registered in the contractor information may be extracted.

The management center 2 displays or outputs information for identifying the user such as the fact of the access and the calling party number on the display device 27 or from the speaker 28 (S43).

FIG. 17(*b*) shows an example of the real-time access information displayed on the display device 27. In the example shown in FIG. 17(*b*), the calling party number (phone number) is displayed together with the message of "There is access now." As long as the calling number can specify the user A, the calling number may be an ID peculiar to the portable phone such as a manufacturing number of the portable phone.

This display and output are immediately implemented when the access is made. In addition, either the display or the output continues during continuing of the access. Since the calling party number or the like has a small amount of information, the management center 2 sends the calling party number or the like to the vehicle in real-time. Thus, by displaying the fact of the access by the user A in real-time, it is possible to recognize that other people are now accessing. Hence, it is possible to recognize this and make proper correspondence. In addition, by continuing display or the like, even if the user B does not get in the vehicle 5, it is possible to recognize the display when the user B returns to the vehicle 5 (S44).

Even if the remote operations are prevented when the user B gets in the vehicle 5, the fact of the access for the remote operations is detected by the management center 2. Therefore, the access information can be displayed in the real-time in a state where the user B gets in the vehicle.

According to the embodiment of the present invention, by displaying the access history, it is possible to make the user B recognize that the vehicle 5 is a subject of the contract of the vehicle information communication service and there is access from the user A. If the notification of the access history is not made so frequently, the user may not feel annoyed.

Fifth Embodiment of the Present Invention

In a fifth embodiment of the present invention, in a case where the user B registers a home position of the vehicle 4 in a navigation system or the like, attention is called to the fact that the vehicle 5 is a subject of the contract of the vehicle information communication service.

Figure 19:
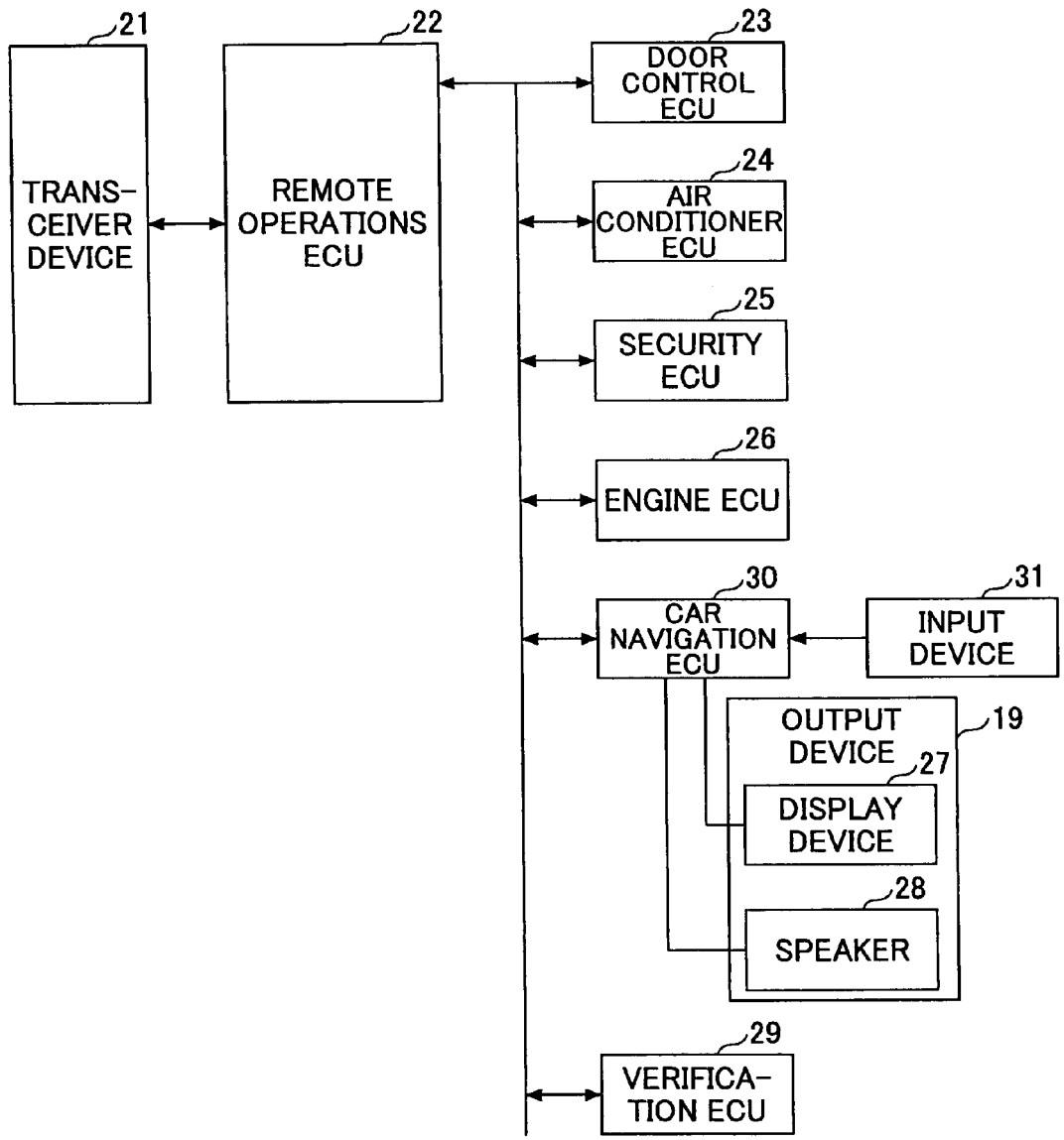
FIG. 19 is a block diagram of functions of a remote operations device of the fifth embodiment of the present invention.

FIG. 19 is a block diagram of functions of a remote operations device of the fifth embodiment of the present invention. In FIG. 19, parts that are the same as the parts shown in FIG. 5 are given the same reference numerals, and explanation thereof is omitted. An example shown in FIG. 19 is different from the example shown in FIG. 5 in that the vehicle 5 has a car navigation ECU 30.

The car navigation ECU 30 receives the electric waves from plural GPS satellites and calculates distance based on arrival time of the electric waves from the GPS satellites to the receiver so as to presume a position of a movable body of a vehicle or the like. In addition, the car navigation ECU 30, based on running distance by a speed sensor or information of a running direction by a gyro sensor, presumes a present position of the vehicle by an autonomous navigation method while running paths of the vehicle are accumulated. In addition, the car navigation ECU 30 holds road map data. The car navigation ECU 30 presumes the present position with high precision by a map matching method whereby the road of the road map data extracted by position presumption via the GPS navigation method or the autonomous navigation method and the position of the vehicle are correlated with each other.

The car navigation ECU 30 has a function of searching for a path from the present position to an object position in a case where the object position is input. The car navigation ECU 30 searches a path wherein passing cost is small under designated conditions, by using a Dijkstra method, for example. In the road map data, in order to calculate the passing cost in advance, a link cost indicating a cost for passing through the road and a node cost indicating a cost for turning right or left at an intersection are stored. For several path candidates, the passing cost of each road section is calculated. After the process is done several times or in a case where designated conditions are satisfied, a path candidate where the passing cost is small is selected as a most proper path.

In the meantime, since a home position is frequently set as the present position of the vehicle 5, the home position is frequently registered in the car navigation ECU 30 in advance. Therefore, in a case where the vehicle 5 is assigned from the user A to the user B, the user B may register a home position in the car navigation ECU 30. Accordingly, in this embodiment, the contractor confirming part 12 of the management center 2 calls the attention to the user B by using registration of the home position in the car navigation ECU 30 as a trigger.

The input device 31 is connected to the car navigation ECU 30 so that the user B can register the home position by using the input device 31. The input device 31 includes a push type keyboard, a button, a remote controller, a cross key, a touch panel, or the like. The input device 31 is operated by the user B. The input device 31 may also include a microphone and operations may be input by recognizing a voice of the user B by a voice recognizing circuit. The home position may be input by using address, the name of a place, a postal code, a phone number, coordinates, or the like.

The car navigation ECU 30 is composed of a computer having a CPU, a ROM, a RAM, a storage device (HDD), an NV-RAM (non-volatile RAM), a communication device, or the like. The home position is stored in the NV-RAN or the storage device.

Figure 20:
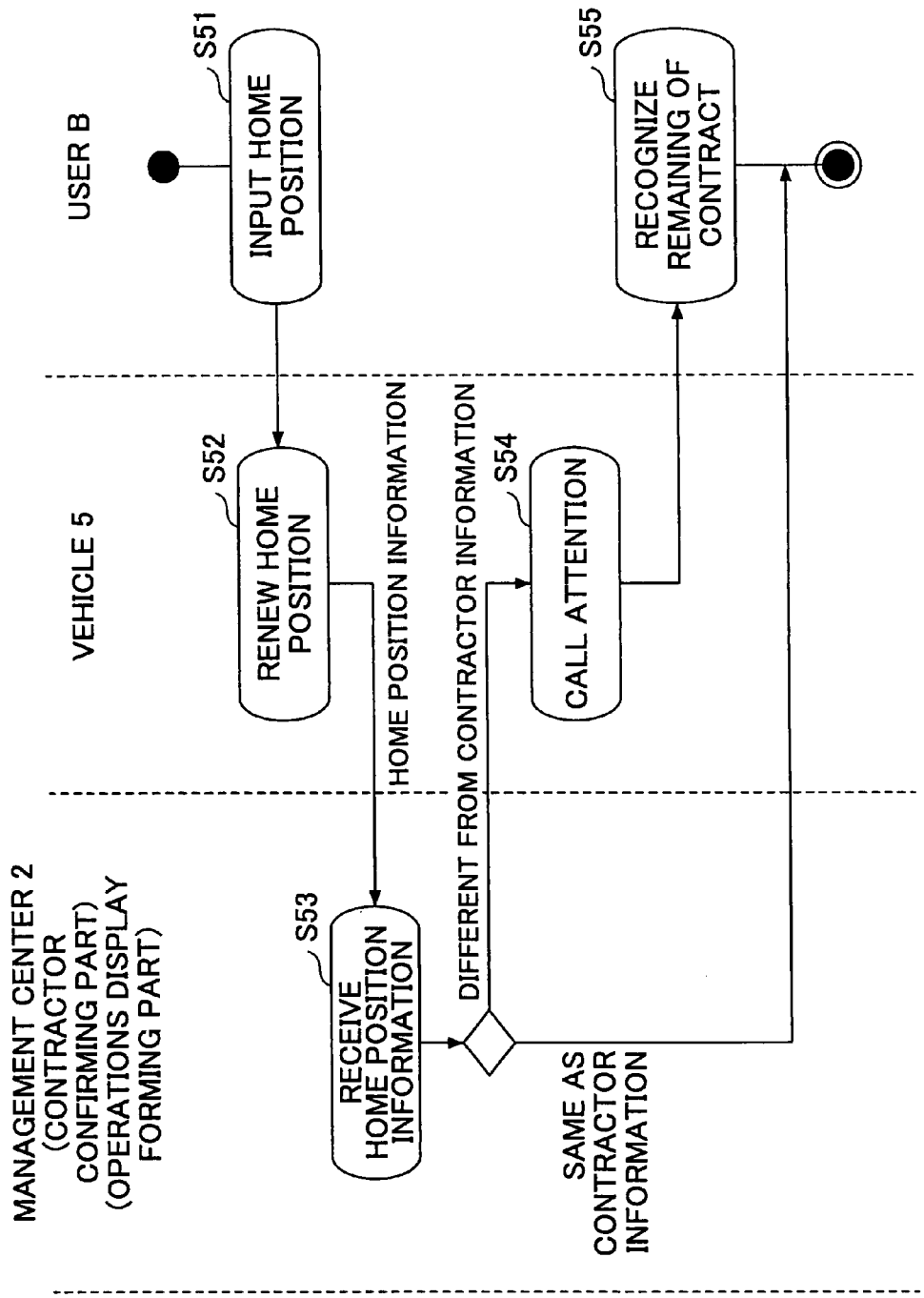
FIG. 20 is a timing chart showing a flow of a process for calling attention by the management center using an input of a user B's home position as a trigger.
Figure 21:
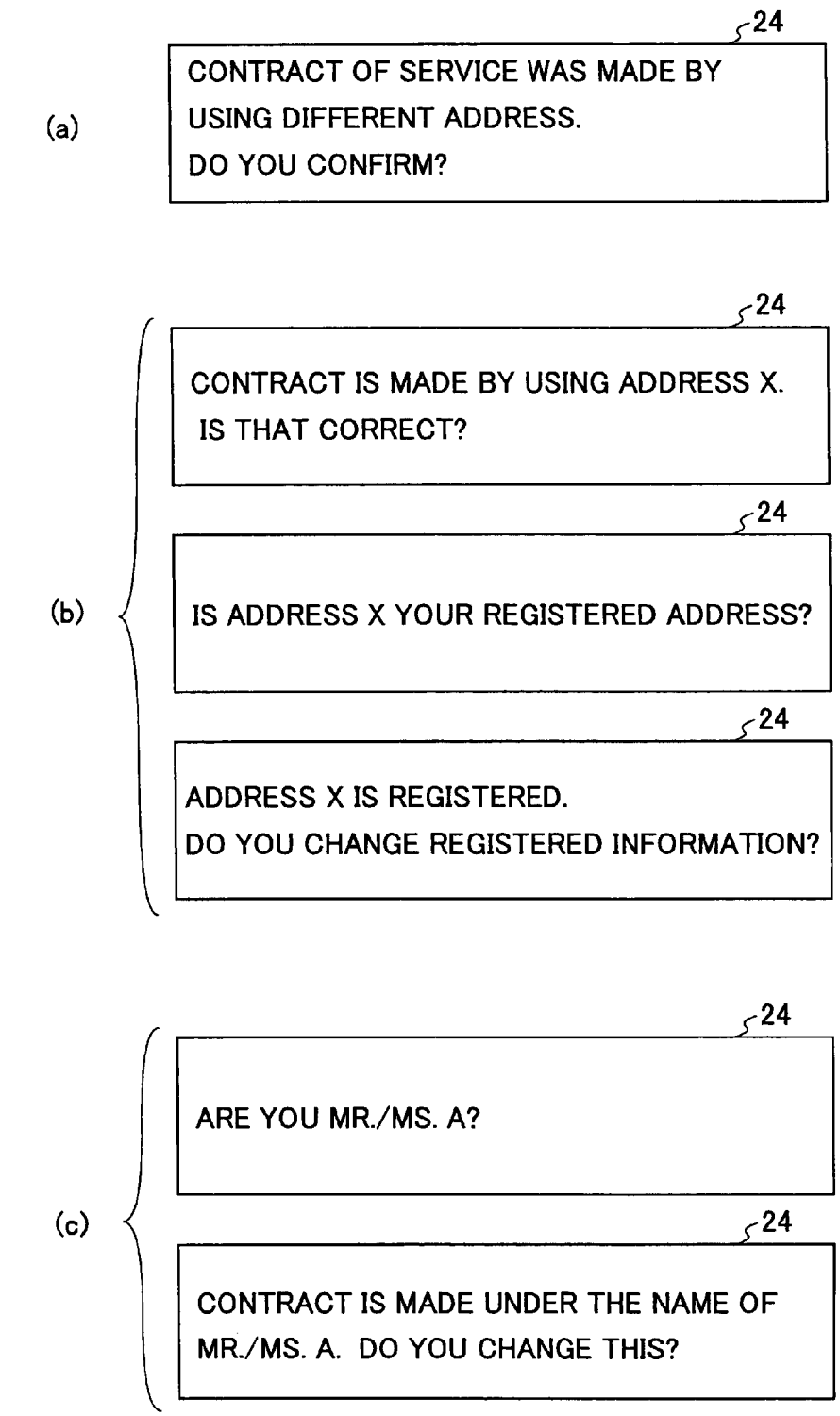
FIG. 21 is a view showing an example of a message for calling attention, the message being displayed on the display device.

FIG. 20 is a timing chart showing a flow of a process for calling attention by the management center using an input of a user B's home position as a trigger.

First, the user B inputs the home position of the vehicle 5 in the car navigation system 26 (S51). The vehicle 5 renews the previous home position by using the input home position (S52). In a case where the previous home position is not registered, the input home position is stored. In this embodiment, even if the home position information is not registered, this process is called renewal. If the home position is renewed, the vehicle 5 sends the home position information to the management center 2.

When the management center 2 receives the home position information (S53), the management center 2 refers to the contractor information and determines whether the sent home position information and address of the contractor information are different from each other. As a result of the determination, if the home position information is not different from the address of the contractor information, the process goes to end.

If the home position information is different from the address of the contractor information, information for calling attention is sent to the vehicle 5 and the information is displayed on the display device 27 of the vehicle 5 and output from the speaker 28 (S54).

FIG. 21(a) is a view showing an example of a message for calling attention, the message being displayed on the display device 27. In the example shown in FIG. 21(a), "CONTRACT OF SERVICE WAS MADE BY USING DIFFERENT ADDRESS. DO YOU CONFIRM?" is displayed. By this message, the user B can recognize that the vehicle 5 is a subject of the contract of the vehicle information communication service (S55).

The user B may be required to input additional information such as the name before the attention is called for in step S54, and attention may be called for after it is determined whether the additional information is the same as information recorded in the contractor information. As a result of this, after it is confirmed that the vehicle 5 is assigned to the user B, attention can be called for.

The following advantages can be obtained by calling for the attention of the user B about registration of the home position.

Since the home position is common in information being input to the vehicle and the contractor information of the vehicle information communication service, there is no need to request input again for confirming the user B. Hence, the user B does not feel annoyed.

The home position may be a trigger even if the user B does not have preliminary knowledge about the existence of the vehicle information communication service or the contract.

Input of the home position is an operation with high probability soon after the vehicle 5 is assigned to the user B. Therefore, it is possible to immediately call for the attention of the user B.

Input of the home position is done not so often and is done at the time of moving or changing of the parking lot. Therefore, if there is no assignment of the vehicle, there is no nuisance attention calling.

Thus, there are a lot of advantages in use of input of the address as a trigger. However, input of other information having such advantages may be used as a trigger. For example, usage information for using the on-vehicle devices, such as a surname, phone number, e-mail address, nickname, avater, or the like can be used. In the followings, the "home position" includes such usage information.

In the meantime, if the user A is malicious, the vehicle 5 may be assigned to the user B after input of the home position of the user B. In this case, since the management center 2 may call the attention to the user A before the vehicle 5 is assigned to the user B, there is little chance that the user B knows the fact that the vehicle 5 is a subject of the vehicle information communication service. Therefore, in a case where the home position is input and is different from the address of the contractor information, it is preferable that the attention be periodically (for example, one a week or once a month) called until the contractor information of the management center 2 is changed. As a result of this, the user B obtains the opportunity when the attention is called so as to know the existence of the vehicle information communication service or the fact that the vehicle is a subject of the contract.

[Modified Example of Calling Attention]

In the above-discussed embodiments, attention is called by using registration of the home position as a trigger. However, even if the home position is input, this is not always caused by the assignment of the vehicle. Accordingly, it is preferable to use an aggressive expression for calling the attention. In a modified example, by using the aggressive expression, attention is called where the vehicle is a subject of the vehicle information communication service.

Figure 22:
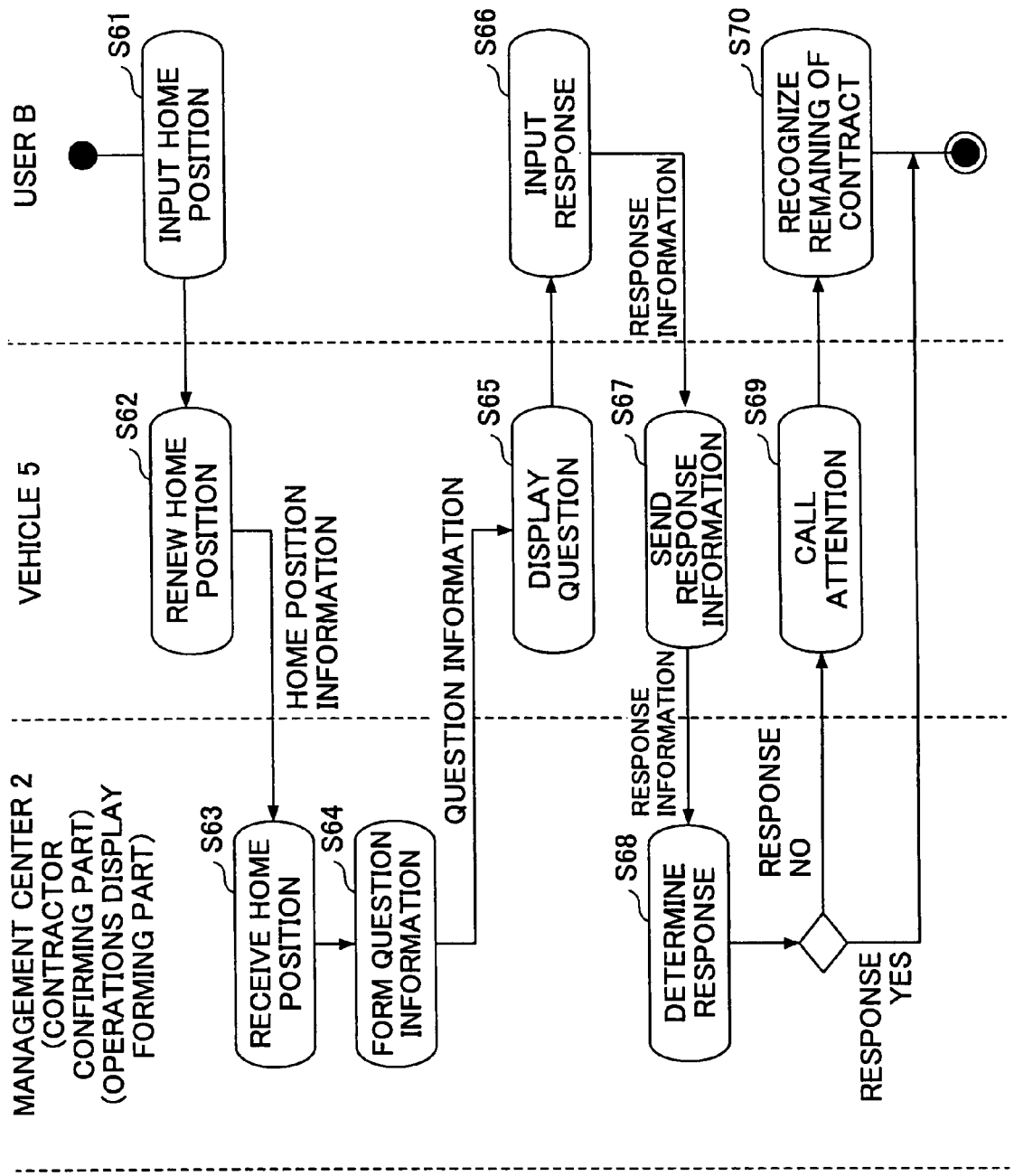
FIG. 22 is a timing chart showing a flow of a process for calling attention by the management center using an input of a user B's home position as a trigger.

FIG. 22 is a timing chart showing a flow of a process for calling attention by the management center 2 using an input of a user B's home position as a trigger. In FIG. 22, parts that are the same as the parts shown in FIG. 20 are given the same reference numerals, and explanation thereof is omitted.

First, the user B inputs the home position of the vehicle 5 in the car navigation system 26 (S61). The vehicle 5 renews the previous home position by using the input home position (S62). In a case where the previous home position is not registered, the input home position is stored. If the home position is renewed, the vehicle 5 sends the home position information to the management center 2.

When the management center 2 receives the home position information (S63), the management center 2 refers to the contractor information and determines whether the sent home position information and address of the contractor information are different from each other. As a result of the determination, if the home position information is not different from the address of the contractor information, the process goes to end.

If the home position information is different from the address of the contractor information, the operations screen forming part 13 forms question information so that the vehicle 5 asks the user B. The contractor confirming part 12 displays on the display device 27 of the vehicle 5 and outputs from the speaker 28 (S64).

FIG. 21(b) shows an example of questions displayed on the display device 27. In the example shown in FIG. 21(b), three questions, "CONTRACT IS MADE BY USING ADDRESS X. IS THAT CORRECT?", "IS ADDRESS X YOUR REGISTERED ADDRESS?", and "ADDRESS X IS REGISTERED. DO YOU CHANGE REGISTERED INFORMATION?" are displayed. The contractor confirming part 12 of the management center 2 displays answer "YES, NO" with such questions (S65).

The address "X" is the address registered by the user A and recorded in the contractor information. When the user B reads the questions shown in FIG. 21(b), since the address X is not user B's registered address, "NO" is selected (S66).

In addition, although the questions shown in FIG. 21(b) are related to the address, questions with respect to name may be displayed as shown in FIG. 21(c). In the example shown in FIG. 21(c), two questions, namely "ARE YOU MR./MS. A?" and "CONTRACT IS MADE UNDER THE NAME OF MR./MS. A. DO YOU CHANGE THIS?", are displayed. Since "MR./MS. A" is name of the user A, the user B reading the questions selects "NO" because "MR./MS. A" is not the name of the user B.

The vehicle 5 sends response information to the management center 2 (S67). The management center 2 determines whether the response information is "YES" or "NO". In a case of "YES" (there is no change of the user), the process goes to end.

In a case of "NO" (there is change of the user), the contractor confirming part 12 sends information for calling the attention of the user B to the vehicle 5. The contractor confirming part 12 display the information on the display device 27 of the vehicle 5 and outputs the information from the speaker 28 (S69).

FIG. 23(a) is a view showing an example of a message for calling attention, the message being displayed on the display device 27. In the example shown in FIG. 23(a) a message for calling for the attention, namely "SERVICE CONTRACTED BY OTHER PEOPLE STILL REMAINS. UNDER THIS SITUATION, THE POSITION OF THE VEHICLE MAY BE OBTAINED BY OTHER PEOPLE OR REMOTE OPERATIONS SUCH AS DOOR LOCKING MAY BE DONE." is displayed.

Thus, since the user B finds that the address or name is different from user B's address or name, it is possible to use an aggressive expression for calling the attention. The user B can recognize, via the message, the vehicle 5 is a subject of the contract of the vehicle information communication service. The user B can also recognize its disadvantage (S55).

[Renewal of the User Information]

In a case where the address is changed but the owner of the vehicle 5 is not changed, namely a case where the vehicle 5 is not assigned, the contractor information of the vehicle information communication service may be renewed. In this case, since the address is changed while the contractor is still the user A, it is preferable to renew the contractor information of the management center 2. However, a certifying part configured to certify that the user inputting the response is a rightful owner of the vehicle is required.

The certifying part is, for example, biometric identification information such as a finger print, a sonogram, a face, or iris, driving license information, or seal. If this certifying information is registered in the management center 2 in advance and devices are configured to read the biometric identification information, the driving license information, or the seal are provided, the management center 2 can certify whether the user is the contractor by following the questions shown in FIG. 21(b) and FIG. 21(c) so as to renew the contractor information.

Figure 24:
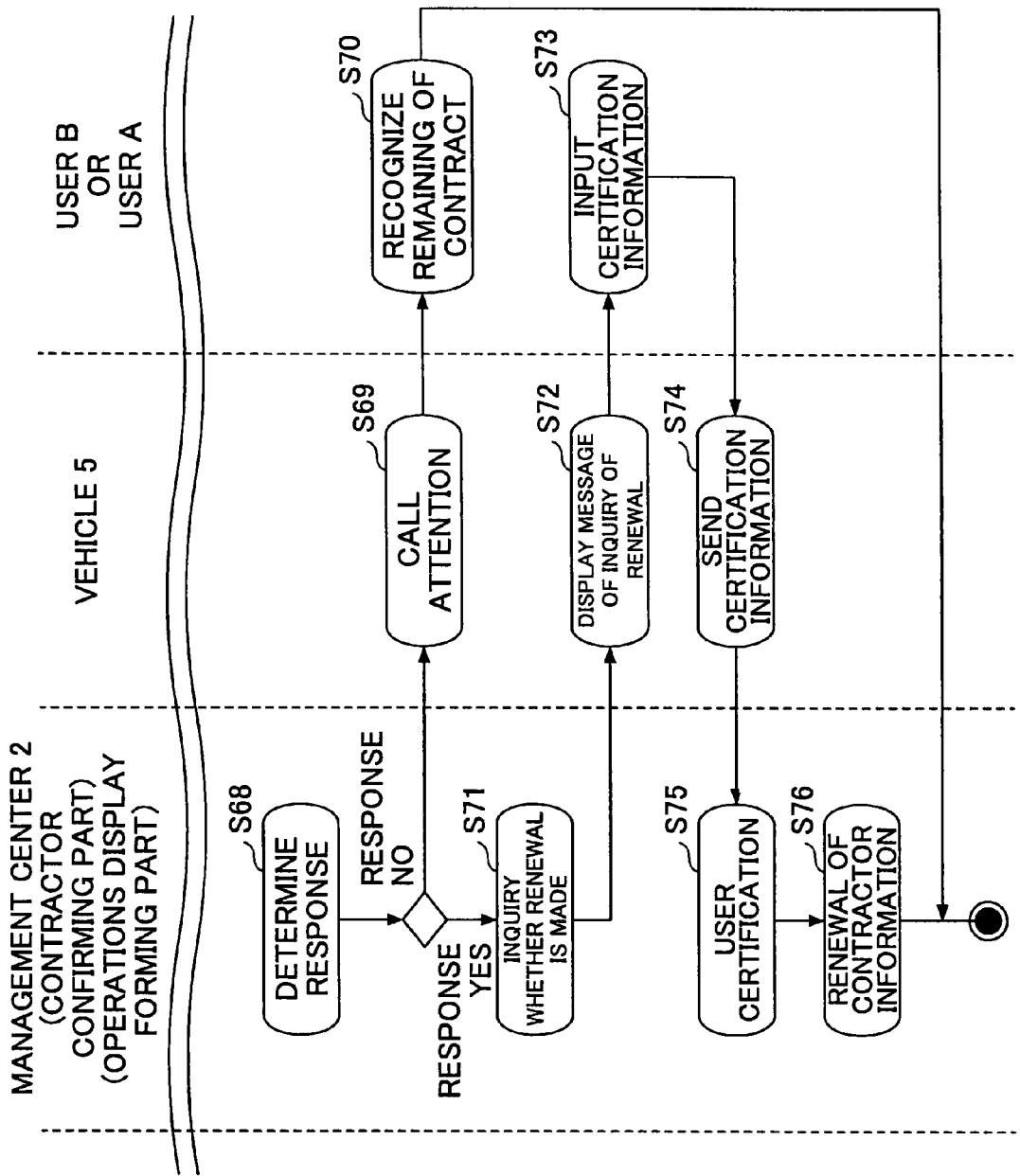
FIG. 24 is a timing chart showing a flow of a process for calling attention by the management center using an input of a user B's home position as a trigger and a process where the contractor information is renewed.

FIG. 24 is a timing chart showing a flow of a process for calling attention by the management center 2 using an input of a user B's home position as a trigger and a process where the contractor information is renewed. In the example shown in FIG. 24, steps to S68 are the same as those shown in FIG. 22. Therefore, explanation of these steps is omitted here.

If the vehicle 5 sends the response information of "YES" or "NO" to the management center 2 (S67), the management center determines whether the response information is "YES" or "NO". In a case of "NO" (there is no change of the user), as discussed with reference to FIG. 22, the attention of the user B is called (S69).

In a case of "YES" (there is no change of the user), the contractor confirming part 12 of the management center 2 asks the user A whether the contractor information is renewed (S71). A message shown in FIG. 23(b) is displayed on the display device 27 of the vehicle 5 (S 72). In the example shown in FIG. 23(b), the message of "DO YOU CHANGE ADDRESS REGISTERED IN THE CONTRACTOR INFORMATION?" is displayed.

Based on such a message, if the user A desires a change of the address, the user A inputs the certification information such as a fingerprint following operations steps (S73). The certification information being input to the vehicle 5 is sent to the management center 2 and the contractor confirming part 12 of the management center 2 compares the certification information being input to the vehicle 5 and the certification information registered in advance (S75) so that the contractor information is renewed (S76). If the contractor information cannot be directly renewed in the vehicle 5, the management center 2 displays advice with respect to a renewing method.

Therefore, according to this example, if the address is changed but the contractor is not changed, it is possible to renew the contractor information.

(Calling Attention Even if there is No Input of the Home Position or the Like)

In the above-discussed embodiments, the attention is called by using registration of the home position being input by the car navigation ECU 30 as a trigger. However, in the above-discussed embodiments, the attention cannot be called without input of the home position. Accordingly, in the modified example, the home position is presumed so that change of the home position is detected.

Since the vehicle 5 has the car navigation ECU 30 as discussed above, it is possible to detect the position of the vehicle 5. Generally, a place where the vehicle 5 parks at night is home. Therefore, a position just before ACC (accessories) off and where the vehicle parks at night (for example, from midnight 12 am to 6 am) is presumed as the home position. In the case of making determination by only one day situation, if the user takes a trip, it is determined that the home position is changed. Therefore, for example, a position where the vehicle parks at night for more than four days is presumed as the home position.

If the parking position at night time is presumed as the home position, in a case where the user works at night, the working place is recognized as the home position. In this case, since the home position is different from that in the contract information of the management center 2, change of the home position is detected and therefore calling attention can be made.

The presumption of the home position may be done by the management center 2 or the vehicle 5. In a case where the presumption of the home position is done by the management center 2, the management center 2 includes a home position presuming part. The home position presuming part receives the parking position at night in a lump from the vehicle 5 every day or once a week. Based on the received parking position at night, a position where the vehicle parks at night for four or more days is presumed as a home position. In addition, in a case where the presumption of the home position is done by vehicle 5, the vehicle 5 includes the home position presuming part. Parking positions at night are added up for every week so that the home position of the vehicle 5 is presumed. A CPU of the on-vehicle device or the management center 2 implements a program so that the home position presuming part is realized.

Figure 25:
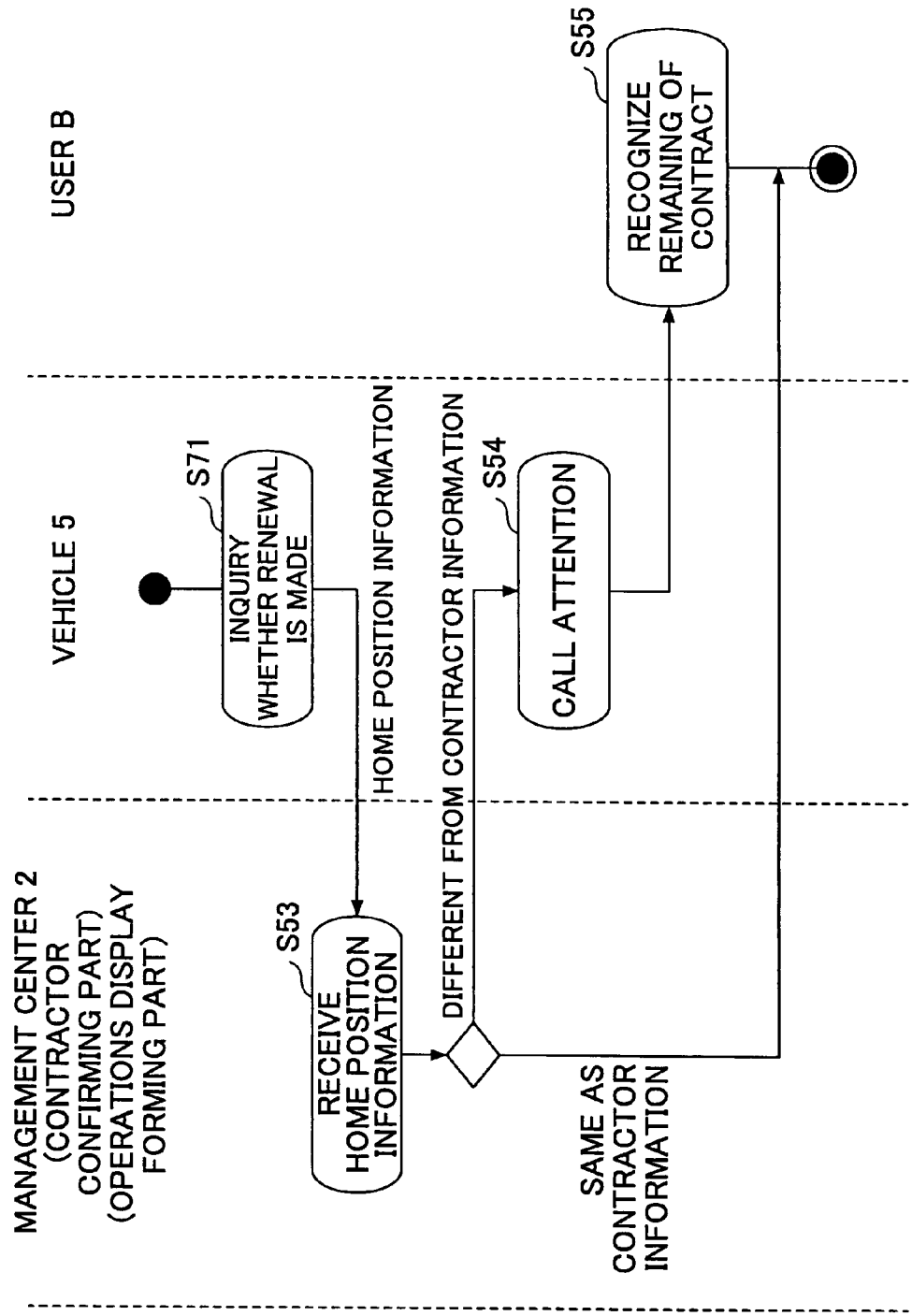
FIG. 25 is a timing chart showing a flow of a process for calling attention by the management center in a case where the vehicle presumes the home position and change of the home position is detected.

FIG. 25 is a timing chart showing a flow of a process for calling attention by the management center 2 in a case where the vehicle 5 presumes the home position and change of the home position is detected. In the example shown in FIG. 25, the home position presuming part of the vehicle 5 presumes the home position.

When the home position presumption part presumes the home position, the home position presumption part compares the presumed home position and the home position presumed the last time or registered by the user. As a result of the comparison, if the home positions are different, the vehicle 5 detects change of the home position and sends the home position information to the management center 2 (S71). Processes after this are the same as those in the example shown in FIG. 22. In other words, When the management center 2 receives the home position information (S53), the management center 2 refers to the contractor information and determines whether the sent home position information and address of the contractor information are different from each other. As a result of the determination, if the home position information is not different from the address of the contractor information, the process goes to end.

If the home position information is different from the address of the contractor information, information for calling attention is sent to the vehicle 5 and the information is displayed on the display device 27 of the vehicle 5 and output from the speaker 28 (S54).

In a case where the management center 2 has the home position presumption part, the contractor information is referred so that whether the presumed home position and the address of the contractor information are different may be determined. After this, the same steps as the steps after step S53 are applied.

According to the modified example, in a case where the vehicle is assigned, even if the assignee user B does not register the home position, the fact that the home position is changed is detected so that the attention of the user B can be called for. After the change of the home position is detected, the attention may be called for after the user B is asked and the fact of the assignment of the vehicle is confirmed as shown in FIG. 22. In addition, after the change of the home position is detected, as shown in FIG. 24, the user B is queried whether renewal is necessary so that the change of the home position may be registered.

Thus, as discussed above, in the vehicle information communication system of the embodiments of the present invention, it is possible to make the assignee recognize the existence of the vehicle information communication service and the fact that the vehicle is a subject of the contract. By recognizing the vehicle information communication service or its contract, the assignee can cancel the vehicle information communication service. In addition, since notification to the assignee is made corresponding to the designated operations of the user and the timings, it is possible to prevent the user from feeling annoyed.

The present invention is not limited to the specifically disclosed embodiments, and various variations and modifications may be made without departing from the scope of the present invention.

This patent application is based on Japanese Priority Patent Application No. 2005-175291 filed on Jun. 15, 2005, the entire contents of which are hereby incorporated by reference.

The invention claimed is:

1. A vehicle information communication system, comprising:
    an on-vehicle device of the vehicle;
    a management server whereby an information terminal connected to a network and the on-vehicle device of the vehicle are in communication with each other;
    wherein the management server includes:
        a contractor confirming part configured to send contractor information of the vehicle information communication system to the vehicle, wherein the contractor information indicates a contractor of the vehicle information communication system, the contractor being able to perform remote operations using the information terminal in order to obtain vehicle information or in order to operate the on-vehicle device,
        a contractor information storage part where the information of the contractor is stored, and
        a sending part configured to send the contractor information of the contractor extracted from the contractor information storage part by the contractor confirming part to the vehicle; and
    wherein the on-vehicle device includes:
        a receiving part configured to receive the contractor information from the management server, and
        an output device configured to output the contractor information in a manner permitting an owner of the vehicle to recognize the contractor information.

2. The vehicle information communication system as claimed in claim 1,
    wherein the output device includes a display device configured to display the contractor information or a voice output device configured to output the contractor information by voice.

3. The vehicle information communication system as claimed in any one of claims 1 and 2,
    wherein the contractor confirming part sends the contractor information to the vehicle in a case where an owner of the vehicle gets in the vehicle, a case where designated information is distributed from the management server, or a case where access is made from the information terminal to the management server.

4. The vehicle information communication system as claimed in any one of claims 1 and 2,
    wherein the on-vehicle device further includes:
    a remote operations authorization part configured to verify operations by the information terminal.

5. The vehicle information communication system as claimed in any one of claims 1 and 2,
    wherein the contractor confirming part sends the contractor information to the vehicle in a case where access is made from the information terminal in a designated state to the contractor confirming part.

6. The vehicle information communication system as claimed in any one of claims 1 and 2,
    wherein the contractor confirming part sends the contractor information to the vehicle in a case where designated operations are performed for the on-vehicle device.

7. The vehicle information communication system as claimed in any one of claims 1 and 2,
    wherein usage information for using the on-vehicle device is input to the on-vehicle device in a case where designated operations are performed for the on-vehicle device.

8. The vehicle information communication system as claimed in any one of claims 1 and 2,
    wherein home position information of the owner of the vehicle or the contractor is input to the on-vehicle device in a case where designated operations are performed for the on-vehicle device.

9. The vehicle information communication system as claimed in claim 1, wherein the management server further includes a password storage part where a password for identifying a contractor of the vehicle information communication system and an expiring date of the password are stored.

10. The vehicle information communication system, as claimed in claim 9,
    wherein the management server permits renewal of the password in a case where designated operations are performed for the on-vehicle device.

11. A vehicle information communication method of a vehicle information communication system, the system including a management server whereby an information terminal connected to a network and an on-vehicle device of a vehicle are in communication with each other, the vehicle information communication method comprising:
    sending contractor information of the vehicle information communication system to the vehicle by a contractor confirming part of the management server, wherein the contractor information indicates a contractor of the vehicle information communication system, the contractor being able to perform remote operations using the information terminal in order to obtain vehicle information or in order to operate the on-vehicle device;
    extracting the contractor information from the contractor information storage part where information of the contractor is stored by the contractor confirming part;
    sending the contractor information to the vehicle by a sending part of the management server;
    receiving the contractor information from the management server by a receiving part of the on-vehicle device; and
    outputting the contractor information by an output device of the on-vehicle device.

12. A management server whereby an information terminal connected to a network and an on-vehicle device of a vehicle are in communication with each other, the management server comprising:
    a contractor confirming part configured to send contractor information of a vehicle information communication system to the vehicle, wherein the contractor information indicates a contractor of the vehicle information communication system, the contractor being able to perform remote operations using the information terminal in order to obtain vehicle information or in order to operate the on-vehicle device;
    a contractor information storage part where the information of the contractor is stored; and
    a sending part configured to send the contractor information of the contractor extracted from the contractor information storage part by the contractor confirming part to the vehicle;

wherein the on-vehicle device includes:
a receiving part configured to receive the contractor information from the management server, and
an output device configured to output the contractor information.

13. An on-vehicle device of a vehicle, which vehicle can be in communication with an information terminal connected to a network via a management server, the on-vehicle device comprising:
a receiving part configured to receive contractor information of a vehicle information communication system from the management server; and
an output device configured to output the contractor information;

wherein the management server includes:
a contractor confirming part configured to send contractor information of the vehicle information communication system to the vehicle, wherein the contractor information indicates a contractor of the vehicle information communication system, the contractor being able to perform remote operations using the information terminal in order to obtain vehicle information or in order to operate the on-vehicle device;
a contractor information storage part where the information of the contractor is stored, and
a sending part configured to send the contractor information of the contractor extracted from the contractor information storage part by the contractor confirming part to the vehicle.

* * * * *